United States Patent
Ujiie et al.

(10) Patent No.: US 11,971,978 B2
(45) Date of Patent: *Apr. 30, 2024

(54) VEHICLE NETWORK SYSTEM WHOSE SECURITY IS IMPROVED USING MESSAGE AUTHENTICATION CODE

(71) Applicant: PANASONIC INTELLECTUAL PROPERTY CORPORATION OF AMERICA, Torrance, CA (US)

(72) Inventors: Yoshihiro Ujiie, Osaka (JP); Masato Tanabe, Kanagawa (JP); Takeshi Kishikawa, Osaka (JP); Tomoyuki Haga, Nara (JP); Hideki Matsushima, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/393,713

(22) Filed: Aug. 4, 2021

(65) Prior Publication Data
US 2021/0365542 A1 Nov. 25, 2021

Related U.S. Application Data

(63) Continuation of application No. 15/386,055, filed on Dec. 21, 2016, now Pat. No. 11,113,382, which is a
(Continued)

(30) Foreign Application Priority Data

Mar. 23, 2015 (JP) ................................. 2015-059387

(51) Int. Cl.
*G06F 21/00* (2013.01)
*B60R 16/023* (2006.01)
(Continued)

(52) U.S. Cl.
CPC .......... *G06F 21/44* (2013.01); *B60R 16/0231* (2013.01); *G06F 13/4208* (2013.01);
(Continued)

(58) Field of Classification Search
CPC ....... G06F 21/44; H04L 12/40; H04L 63/123; H04L 67/12
See application file for complete search history.

(56) References Cited

U.S. PATENT DOCUMENTS

| 2014/0185463 A1 | 7/2014 | Likkei |
| 2014/0310530 A1 | 10/2014 | Oguma et al. |

(Continued)

FOREIGN PATENT DOCUMENTS

| CN | 106464557 B | 4/2020 |
| EP | 3142288 | 3/2017 |

(Continued)

OTHER PUBLICATIONS

The Extended European Search Report from the European Patent Office (EPO) dated Jun. 6, 2017 for the related European Patent Application No. 15819615.4.
(Continued)

*Primary Examiner* — Rodman Alexander Mahmoudi
(74) *Attorney, Agent, or Firm* — Greenblum & Bernstein, P.L.C.

(57) ABSTRACT

A vehicle network system employing a controller area network protocol includes a bus, a first electronic control unit, and a second electronic control unit. The first electronic control unit transmits, via the bus, at least one data frame including an identifier relating to data used for a calculation for obtaining a message authentication code indicating authenticity of transmission content. The second electronic control unit receives the at least one data frame transmitted vis the bus and verifies the message authentication code in
(Continued)

accordance with the identifier included in the at least one data frame.

12 Claims, 17 Drawing Sheets

Related U.S. Application Data continuation of application No. PCT/JP2015/002506, filed on May 19, 2015.

(60) Provisional application No. 62/022,741, filed on Jul. 10, 2014.

(51) Int. Cl.
    *G06F 13/42*     (2006.01)
    *G06F 21/44*     (2013.01)
    *H04L 9/40*     (2022.01)
    *H04L 12/40*     (2006.01)
    *H04L 29/06*     (2006.01)
    *H04L 67/12*     (2022.01)

(52) U.S. Cl.
    CPC ............ *H04L 12/40* (2013.01); *H04L 63/123* (2013.01); *H04L 2012/40215* (2013.01); *H04L 67/12* (2013.01)

(56) References Cited

U.S. PATENT DOCUMENTS

| | | | |
|---|---|---|---|
| 2015/0079941 A1* | 3/2015 | Arkko | H04W 68/00 455/411 |
| 2015/0089236 A1* | 3/2015 | Han | H04L 63/0227 713/168 |
| 2017/0109521 A1 | 4/2017 | Ujiie et al. | |
| 2017/0195878 A1* | 7/2017 | Takemori | B60R 16/023 |

FOREIGN PATENT DOCUMENTS

| | | |
|---|---|---|
| EP | 3142291 | 3/2017 |
| JP | 2013-098719 | 5/2013 |
| WO | 2013/175633 | 11/2013 |

OTHER PUBLICATIONS

International Search Report of PCT application No. PCT/JP2015/002506 dated Jul. 28, 2015.
CAN Specification 2.0, Sep. 1991, [online], CAN in Automation(CiA), [seached on Nov. 14, 2014], Internet<URL: http://www.can-cia.org/fileadmin/cia/specifications/CAN20A.pdf>.
H. Krawczyk et al., "HMAC: Keyed-Hashing for Message Authentication", Network Working Group, RFC2104, Feb. 1997.
English Translation of Chinese Search Report issued by the China National Intellectual Property Administration (CNIPA) in Chinese Patent Application No. 202010254008.6, dated Jan. 12, 2024.

\* cited by examiner

FIG. 6
| RECEPTION ID LIST |
|---|
| 1 |
| 2 |
| 3 |
| 4 |
FIG. 7
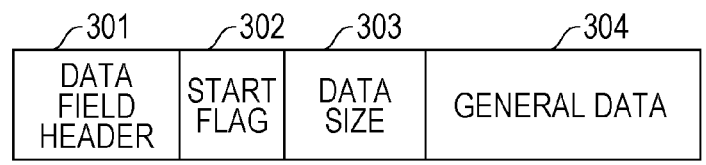
FIG. 8
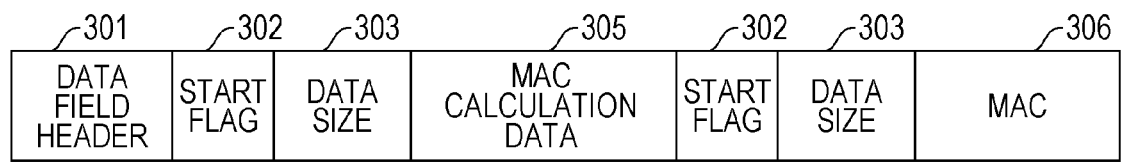
FIG. 9
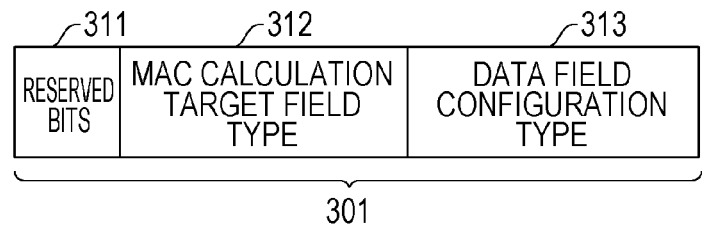

FIG. 10

| TYPE | VALUE |
|---|---|
| NONE | 000 |
| ONLY ID FIELD | 100 |
| ONLY DLC FIELD | 010 |
| ONLY DATA FIELD | 001 |
| ID FIELD+DLC FIELD | 110 |
| ID FIELD+DATA FIELD | 101 |
| DLC FIELD+DATA FIELD | 011 |
| ID FIELD+DLC FIELD+DATA FIELD | 111 |

FIG. 11

| TYPE | VALUE |
|---|---|
| ONLY GENERAL DATA | 001 |
| ONLY MAC CALCULATION DATA | 010 |
| ONLY MAC | 100 |
| GENERAL DATA+MAC CALCULATION DATA | 011 |
| GENERAL DATA+MAC | 101 |
| MAC CALCULATION DATA+MAC | 110 |
| GENERAL DATA+MAC CALCULATION DATA+MAC | 111 |

FIG. 12

| FLAG TYPE | DATA |
|---|---|
| GENERAL DATA | 00 |
| MAC CALCULATION DATA | 01 |
| MAC | 10 |

FIG. 13

| ID | CONTENT OF DATA FIELD (DATA) |
|---|---|
| 1 | 0x0e 48 00 a0 1a c4 f7 d3 |
| 1 | 0x01 08 01 |
| 1 | 0x1e 48 02 a0 34 5c ef 79 |
| ... | ... |

FIG. 20

| FRAME No. | TOTAL NUMBER OF FRAMES | NUMBER OF FRAMES INCLUDING MAC CALCULATION DATA | NUMBER OF FRAMES INCLUDING MAC |
|---|---|---|---|
| 2321 | 2322 | 2323 | 2324 |

| ID | CONTENT OF DATA FIELD (DATA) |
|----|------------------------------|
| 1 | 0x04 88 8e 48 00 90 1a c4 |
| 1 | 0x00 00 01 08 01 |
| 1 | 0x04 88 9e 48 02 90 34 5c |
| ... | ... |

VEHICLE NETWORK SYSTEM WHOSE SECURITY IS IMPROVED USING MESSAGE AUTHENTICATION CODE

CROSS REFERENCE TO RELATED APPLICATIONS

This is a continuation of U.S. patent application Ser. No. 15/386,055, filed Dec. 21, 2016, which is a continuation of International Patent Appl. No. PCT/JP2015/002506, filed May 19, 2015, which claims priority to Japanese Patent Appl. No. 2015-059387, filed Mar. 23, 2015, and the benefit of U.S. Provisional Patent Appl. No. 62/022,741, filed Jul. 10, 2014. The entire disclosure of each of the above-identified documents, including the specification, drawings, and claims, is incorporated herein by reference in its entirety.

BACKGROUND

1. Technical Field

The present invention relates to a technique for communicating messages in a vehicle network.

2. Description of the Related Art

During these years, a large number of devices called "electronic control units (ECUs)" are provided in a system inside an automobile. A network connecting these ECUs with one another is called a "vehicle network". A lot of standards exist for vehicle networks. A standard called a "controller area network (CAN)" specified in International Organization for Standardization (ISO) 11898-1 exists for one of principal vehicle networks (refer to "CAN Specification 2.0 Part A, [online], CAN in Automation (CiA), [Retrieved on Nov. 14, 2014], Internet (URL: http://www.can.cia.org/fileadmin/cia/specifications/CAN20A.pdf)").

In a CAN, a communication path is configured by two buses, and ECUs connected to the buses are called "nodes". The nodes connected to the buses communicate messages called "frames". A transmission node, which transmits a frame, applies voltage to the two buses to generate a potential difference between the buses and transmit a value of 1 called a "recessive" and a value of 0 called a "dominant". If a plurality of transmission nodes transmit a recessive and a dominant at exactly the same timing, the dominant takes priority in transmission. If a format of a received frame is abnormal, a reception node transmits a frame called an "error frame". An error frame refers to successive transmission of 6 bits of dominants for notifying a transmission node and other reception nodes of an abnormality in a frame.

In the CAN, there are no identifiers identifying destinations and sources. A transmission node transmits each frame with an identifier (ID) called a "message ID" added (that is, transmits a signal to the buses), and each reception node receives only a predetermined message ID (that is, reads a signal from the buses). In addition, a carrier sense multiple access/collision avoidance (CSMA/CA) method is employed, and when a plurality of nodes simultaneously perform transmission, mediation is carried out using message IDs. That is, a frame whose message ID is smaller takes priority in transmission.

A vehicle body might be illicitly controlled when an unauthorized node is connected to buses in a vehicle network and illicitly transmits a frame. In order to prevent transmission of such an unauthorized frame and resultant control, a technique for adding a message authentication code (MAC) to a data field in a CAN and transmitting the MAC is generally known (refer to Japanese Unexamined Patent Application Publication No. 2013-98719).

SUMMARY

In a CAN frame, there is no field for adding a MAC, and a data field in a CAN is small, namely 8 bytes. If a MAC is stored in the data field of each frame, data to be transmitted that cannot be included in the data field might be divided between a plurality of frames for transmission. In this case, the number of frames flowing through buses increases, which leads to an increase in traffic in the buses.

One non-limiting and exemplary embodiment provides a vehicle network system that improves the security of a message (frame) communicated and that suppresses an increase in traffic in buses. In addition, the present disclosure provides an ECU, a reception method, and a transmission method used in the vehicle network system.

In one general aspect, the techniques disclosed here feature a vehicle network system employing a controller area network protocol. The vehicle network system includes a bus, a first electronic control unit connected to the bus, and a second electronic control unit connected to the bus. The first electronic control unit performs operations including transmitting, via the bus, at least one data frame including an identifier relating to data used for a calculation for obtaining a message authentication code indicating authenticity of transmission content. The second electronic control unit performs operations including receiving the at least one data frame transmitted via the bus, selecting the data used for the calculation for obtaining the message authentication code in accordance with the identifier included in the at least one data frame, and verifying the message authentication code using the selected data.

According to the present disclosure, the security of a message communicated improves and an increase in traffic in buses can be suppressed using a MAC indicating the authenticity of transmission content.

It should be noted that general or specific embodiments may be implemented as a system, a method, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of a received ID list;

FIG. 7 is a diagram illustrating an example of a data field format of a data frame;

FIG. 8 is a diagram illustrating an example of the data field format of a data frame;

FIG. 9 is a diagram illustrating a data configuration of a data field header in the first embodiment;

FIG. 10 is a diagram illustrating an example of the content of a MAC calculation target field type;

FIG. 11 is a diagram illustrating an example of the content of a data field configuration type;

FIG. 12 is a diagram illustrating an example of the content of a start flag;

FIG. 13 is a diagram illustrating an example of IDs and data fields of frames transmitted by the ECU connected to an engine;

FIG. 20 is a diagram illustrating a data configuration of frame property data;

FIG. 21 is a diagram illustrating an example of IDs and data fields of frames transmitted by the ECU connected to an engine;

DETAILED DESCRIPTION

Figure 1:
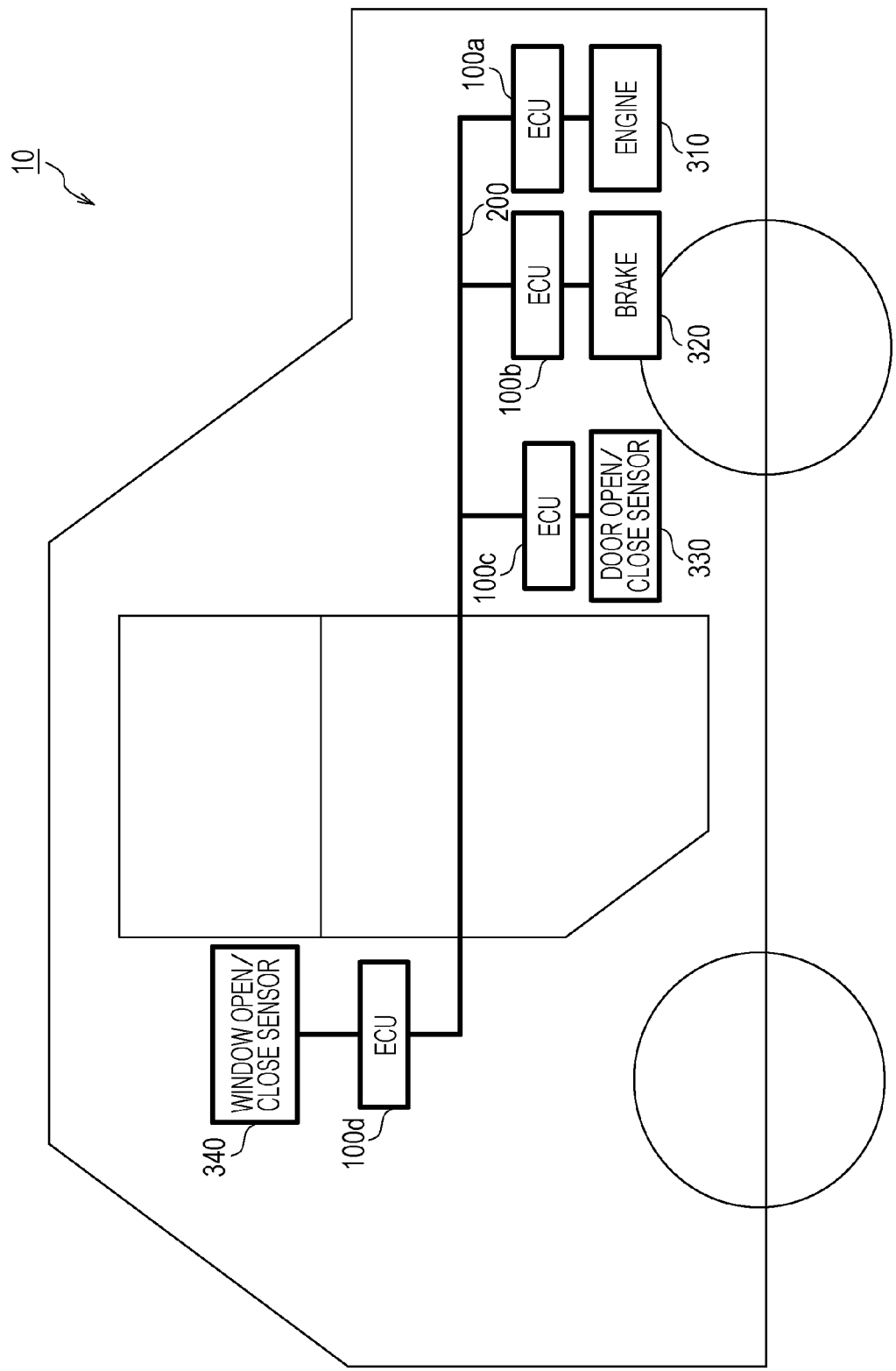
FIG. 1 is a diagram illustrating an overall configuration of a vehicle network system according to a first embodiment.

A vehicle network system according to an embodiment of the present disclosure is a vehicle network system employing a controller area network protocol. The vehicle network system includes a bus, a first electronic control unit connected to the bus, and a second electronic control unit connected to the bus. The first electronic control unit performs operations including transmitting, via the bus, at least one data frame including an identifier relating to data used for a calculation for obtaining a message authentication code indicating authenticity of transmission content. The second electronic control unit performs operations including receiving the at least one data frame transmitted via the bus, selecting the data used for the calculation for obtaining the message authentication code in accordance with the identifier included in the at least one data frame, and verifying the message authentication code using the selected data. As a result, the security of a message communicated improves using a MAC indicating the authenticity of transmission content. In addition, since an ECU on a transmission side can transmit information used for obtaining the MAC to an ECU on a reception side using an identifier relating to data used for calculation for obtaining the MAC, for example, information regarding data configuration such as a data value necessary to verify the MAC and the MAC can be transmitted. As a result, for example, the configuration of data stored in a data field can be arbitrarily determined in the vehicle network system. If an ECU can arbitrarily set data for which a MAC needs to be verified, data for which a MAC need not be verified, and a MAC in a data field and transmit these pieces of data, an increase in traffic in the bus can be suppressed.

In addition, the first electronic control unit may obtain the message authentication code through calculation using data arranged in one or more areas in the at least one data frame. At least one of the at least one data frame may include the message authentication code. The identifier may include information indicating the one or more areas in the at least one data frame used for the calculation for obtaining the message authentication code. The second electronic control unit may perform the verifying through the calculation using the data arranged in the one or more areas indicated by the identifier. As a result, for example, whether to arrange one or more areas used for calculation for obtaining a MAC in an arbitrary field in a data frame or at an arbitrary position in a certain field can be arbitrarily set. As a result, for example, an increase in the traffic in the bus can be suppressed or security can be enhanced.

In addition, the identifier may further include information indicating a number of the at least one data frame. After receiving the number of the at least one data frame indicated by the identifier, the second electronic control unit may perform the verifying through the calculation using the data arranged in the one or more areas indicated by the identifier. As a result, since an ECU that transmits data frames can notify an ECU that receives the data frames of the number of frames transmitted, for example, data necessary to verify a MAC can be divided between a plurality of data frames and transmitted, and a degree of freedom of data configuration or frame arrangement increases. As the frame arrangement, for example, single frame, which is a state in which a MAC is included in a single frame (that is, a state in which the MAC can be verified immediately after this frame is received), or multi-frame, which is a state in which a MAC is divided between a plurality of frames, can be arbitrarily selected.

In addition, a method according to an aspect of the present disclosure is a method for a vehicle network system, the vehicle network system employing a controller area network protocol and including a bus, a first electronic control unit connected to the bus, and a second electronic control unit connected to the bus. The method includes receiving, by the second electronic control unit, at least one data frame, which is transmitted by the first electronic control unit via the bus, including an identifier relating to data used for a calculation for obtaining a message authentication code indicating authenticity of transmission content, selecting, by the second electronic control unit, the data used for the calculation for obtaining the message authentication code, and performing, by the second electronic control unit, a process for verifying the message authentication code using the selected data. As a result, the content of the verification process (e.g., a position in the one or plurality of data frames at which data used for calculation for the verification is obtained or the like) can be changed using the identifier included in the one or plurality of data frames, and an appropriate verification process flexibly suitable for data configuration can be performed.

In addition, the identifier may indicate a type of content of a data field of the at least one data frame. As a result, for example, the reception side of the one or plurality of data frames can receive information indicating whether the data field of the one or plurality of data frames includes data for which a MAC is to be calculated, whether the data field of the one or plurality of data frames includes data for which a MAC is not to be calculated, and whether the data field of the one or plurality of data frames includes a MAC as the type. The type of data stored in the data field, therefore, can be arbitrarily determined with this reception method, and, for example, an increase in the traffic in the bus can be suppressed compared to when the ECUs communicate only data to which a MAC is added in the vehicle network system.

In addition, at least one of the at least one data frame may include the message authentication code. The type of content may indicate whether the data field includes an area of the data used for the calculation for obtaining the message authentication code. If the type of content indicates that the data field includes the area of the data used for the calculation for obtaining the message authentication code, the verifying may be performed through the calculation using a value of the area of the data used for the calculation for obtaining the message authentication code included in the data field. As a result, the process for verifying a MAC can be appropriately performed by identifying whether the data field of the one or plurality of data frames includes data for which a MAC is to be calculated.

In addition, the identifier may indicate an area of data of a type in a data field of the at least one data frame. As a result, for example, the reception side of the one or plurality of data frames can receive information indicating a position (range) in the data field of the one or plurality of data frames at which data for which a MAC is to be calculated, data for which a MAC is not to be calculated, or a MAC is arranged. The arrangement of data stored in the data field, therefore, can be arbitrarily determined with the reception method.

In addition, at least one of the at least one data frame may include the message authentication code. The area of data of the type may be the area of data used for the calculation for obtaining the message authentication code. The process for verifying may be performed using the data arranged in the area indicated by the identifier. As a result, data for which a MAC is to be calculated can be appropriately collected by checking a position (range) in the data field of the one or plurality of data frames at which the data for which a MAC is to be calculated is included.

In addition, the identifier may be arranged in a data field of the at least one data frame. As a result, the process for verifying a MAC can be appropriately performed by referring to the data field whose specifications can be determined in the vehicle network system in accordance with the CAN protocol and checking the identifier.

In addition, the identifier may include information indicating one or more areas of data in the at least one data frame. The process for verifying may be performed using the data in the one or more areas according to the identifier. As a result, the field, a position, and the like at which data used for calculation for verifying the MAC can be identified with the identifier, and the process for verifying a MAC can be appropriately performed.

In addition, a method according to an aspect of the present disclosure is a method for a vehicle network system, the vehicle network system employing a controller area network protocol and including a bus, a first electronic control unit connected to the bus, and a second electronic control unit connected to the bus. The method includes obtaining, by the first electronic control unit, a message authentication code indicating authenticity of transmission content through calculation using data arranged in one or more areas in at least one data frame and transmitting, by the first electronic control unit, the at least one data frame to the bus. The at least one data frame include an identifier for selecting the data used for the calculation for obtaining the message authentication code. At least one of the at least one data frame includes the obtained message authentication code. As a result, for example, an ECU on a transmission side of the one or plurality of data frames can notify, using the identified included in the one or plurality of data frames, an ECU on a reception side of a position in the one or plurality of data frames at which the data used for the calculation for obtaining the MAC is arranged. Data configuration in the one or plurality of data frames, therefore, can be arbitrarily set.

In addition, the identifier may indicate a type of content of a data field of the at least one data frame. As a result, for example, the ECU on the transmission side of the one or plurality of data frames can notify, as the type, the ECU on the reception side of information indicating whether the data field of the one or plurality of data frames includes data for which a MAC is to be calculated, whether the data field of the one or plurality of data frames includes data for which a MAC is not to be calculated, and whether the data field of the one or plurality of data frames includes a MAC. The type of data stored in the data field, therefore, can be arbitrarily determined, and, for example, an increase in the traffic in the bus can be suppressed compared to when the ECUs communicate only data to which a MAC is added in the vehicle network system.

In addition, the type of content may indicate whether the data field includes the one or more areas of the data used for the calculation for obtaining the message authentication code. As a result, whether to include data for which a MAC is to be calculated in the data field of the one or plurality of data frames can be selected, and data configuration can be arbitrarily determined.

In addition, the identifier may indicate an area of data of a type in a data field of the at least one data frame. As a result, for example, the ECU on the transmission side can transmit, to the ECU on the reception side, information indicating a position (range) in the data field of the one or plurality of data frames at which data for which a MAC is to be calculated, data for which a MAC is not to be calculated, or a MAC is arranged. The arrangement of data stored in the data field, therefore, can be arbitrarily determined.

In addition, the area of data of the type may be the one or more areas of the data used for the calculation for obtaining the message authentication code. As a result, the ECU on the transmission side of the one or plurality of data frames can notify the ECU on the reception side of a position (range) in the data field of the one or plurality of data frames at which data for which a MAC is to be calculated is included. The data for which a MAC is to be calculated, therefore, can be arranged at an arbitrary position.

In addition, the identifier may be arranged in a data field of the at least one data frame transmitted by the first electronic control unit. As a result, information regarding the data used for the calculation for obtaining the MAC can be transmitted using the data field whose specifications can be determined in the vehicle network system in accordance with the CAN protocol. This transmission method, therefore, can be easily achieved with ECUs according to the CAN protocol.

In addition, the identifier may include information indicating the one or more areas of the data in the at least one data frame used for the calculation for obtaining the message authentication code. As a result, the field, a position, and the like at which data used for calculation for verifying the MAC can be appropriately transmitted, and a degree of freedom of data configuration or the like increases.

In addition, an ECU according to an aspect of the present disclosure is an electronic control unit employing a controller area network protocol. The electronic control unit includes one or more memories and circuitry that, in operation, performs operations including receiving at least one data frame, which is transmitted by another electronic control unit via a bus, including an identifier relating to data used for a calculation for obtaining a message authentication code indicating authenticity of transmission content, selecting the data used for the calculation for obtaining the message authentication code in accordance with the identifier included in the at least one data frame, and verifying the message authentication code using the selected data. As a result, the content of the verification process can be changed using the identifier included in the one or plurality of data frames, and an appropriate verification process flexibly suitable for data configuration can be performed. In a vehicle network constructed by including this ECU, for example, the configuration of data stored in a data field can be arbitrarily determined, information indicating whether to verify a MAC, information regarding an area of data used for verifying a MAC, or the like can be included in a data frame as an identifier, and the data frame can be communicated. As a result, for example, data frames can be communicated in such a way as to suppress an increase in traffic in the bus.

In addition, an ECU according to an aspect of the present disclosure is an electronic control unit employing a controller area network protocol. The electronic control unit includes one or more memories and circuitry that, in operation, performs operations including obtaining a message authentication code indicating authenticity of transmission content through calculation using data arranged in one or more areas in one or a plurality of data frames, and transmitting the at least one data frame to a bus to which the electronic control unit is connected. The at least one data frame includes an identifier for selecting the data used for the calculation for obtaining the message authentication code. At least one of the at least one data frame includes the obtained message authentication code. As a result, an ECU on a transmission side of the one or plurality of data frames can notify, using the identifier included in the one or plurality of data frames, an ECU on a reception side of a position in the one or plurality of data frames at which the data used for the calculation for obtaining a MAC is arranged. Data configuration in the one or plurality of data frames, therefore, can be arbitrarily set.

It should be noted that these general or specific aspects may be implemented as a system, a method, an integrated circuit, a computer program, a computer-readable storage medium such as a CD-ROM, or any selective combination thereof.

Vehicle network systems according to embodiments will be described hereinafter with reference to the drawings. The following embodiments are specific examples of the present disclosure. Values, components, the arrangement and connection modes of the components, steps, the order of the steps, and the like mentioned in the following embodiments, therefore, are examples and do not limit the present disclosure. Among the components described in the following embodiments, ones not described in the independent claims are components that may be arbitrarily added. In addition, the drawings are schematic diagrams and not necessarily strict illustrations.

First Embodiment

A vehicle network system 10 including an ECU that makes it possible to verify data using a MAC and that achieves a transmission method or a reception method for realizing efficient communication of the data will be described hereinafter as an embodiment of the present disclosure with reference to the drawings.

1.1 Overall Configuration of Vehicle Network System 10

FIG. 1 is a diagram illustrating the overall configuration of the vehicle network system 10 according to a first embodiment. The vehicle network system 10 is an example of a network communication system that performs communication in accordance with a CAN protocol and a network communication system in an automobile on which various devices such as control devices and sensors are mounted. The vehicle network system 10 is configured by including buses 200 and nodes connected to the buses 200, such as ECUs 100a to and 100d, connected to the various devices. Although omitted in FIG. 1, the vehicle network system 10 can include a number of ECUs other than the ECUs 100a to 100d. The ECUs 100a to 100d, however, will be focused upon for the sake of convenience. Each ECU, for example, is a device including a digital circuit, an analog circuit, a communication circuit, and the like such as a processor (microprocessor) and a memory. The memory is a read-only memory (ROM), a random-access memory (RAM), or the like and capable of storing a control program (computer program) executed by the processor. When the processor operates in accordance with the control program (computer program), for example, the ECUs achieve various functions. It is to be noted that the computer program is configured by combining a plurality of command codes indicating instructions to the processor in order to achieve certain functions.

The ECUs 100a to 100d are connected to an engine 310, a brake 320, a door open/close sensor 330, and a window open/close sensor 340, respectively. The ECUs 100a to 100d obtain states of the connected devices (the engine 310 and the like) and regularly transmit frames (data frames that will be described later) indicating the states to a network (i.e., the buses). The ECUs 100a to 100d perform a process for transmitting a data frame (described later), which is performed to transmit a data frame, and a process for receiving a data frame (described later), which is performed to receive a data frame.

In the vehicle network system 10, the ECUs communicate frames in accordance with the CAN protocol. Frames in the CAN protocol include a data frame, a remote frame, an overload frame, and an error frame. The data frame and the error frame will be mainly described for the sake of the convenience of description.

1.2 Data Frame Format

The data frame, which is one of the frames used in a network according to the CAN protocol, will be described hereinafter.

Figure 2:
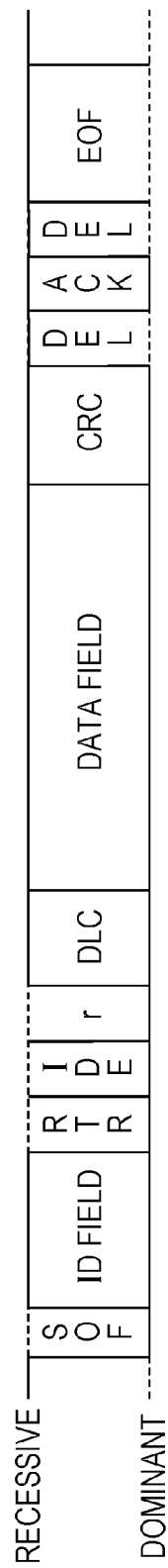
FIG. 2 is a diagram illustrating a format of a data frame specified in a CAN protocol.

FIG. 2 is a diagram illustrating a format of the data frame specified in the CAN protocol. FIG. 2 illustrates a data frame in a standard ID format specified in the CAN protocol. The data frame includes fields of a start of frame (SOF), an ID field, a remote transmission request (RTR), an identifier extension (IDE), a reserved bit "r", a data length code (DLC), a data field, a cyclic redundancy check (CRC) sequence, a CRC delimiter "DEL", an acknowledgement (ACK) slot, an ACK delimiter "DEL", and an end of frame (EOF).

The SOF is configured by a 1-bit dominant. When the buses are idle, the data frame is recessive. By making the data frame dominant using the SOF, start of transmission of the frame is notified.

The ID field is a field in which an ID (frame ID), which is a value configured by 11 bits and indicating a type of data, is stored. The ID field is designed such that a frame having a smaller ID value has higher priority, so that if a plurality of nodes simultaneously start transmission, the communication can be mediated using the ID field.

The RTR is a value for distinguishing a data frame and a remote frame. In the data frame, the RTR is configured by a dominant 1 bit.

The IDE and the "r" are both configured by a dominant 1 bit.

The DLC is configured by 4 bits and is a value indicating the length of the data field. It is to be noted that the IDE, the "r", and the DLC will be collectively referred to as a "control field".

The data field is a value configured by up to 64 bits and indicating the content of data to be transmitted. The length can be adjusted in steps of 8 bits. Specifications of the data to be transmitted are not specified in the CAN protocol but determined by the vehicle network system 10. The specifications, therefore, depend upon a vehicle model, a manufacturer (manufacturing maker), and the like.

The CRC sequence is configured by 15 bits. The CRC sequence is obtained from values transmitted in the SOF, the ID field, the control field, and the data field.

The CRC delimiter is a delimitation sign configured by a 1-bit recessive and indicating an end of the CRC sequence. It is to be noted that the CRC sequence and the CRC delimiter will be collectively referred to as "a CRC field".

The ACK slot is configured by 1 bit. A transmission node performs transmission with the ACK slot recessive. If a reception node can correctly receive a data frame up to the CRC sequence, the reception node performs transmission with the ACK slot dominant. Since a dominant takes priority over a recessive, if the ACK slot is dominant after the transmission, the transmission node can affirm that one of reception nodes has successfully received the data frame.

The ACK delimiter is a delimitation sign configured by a 1-bit recessive and indicating an end of the ACK.

The EOF is configured by 7 bits of recessives and indicates an end of the data frame.

1.3 Error Frame Format

Figure 3:
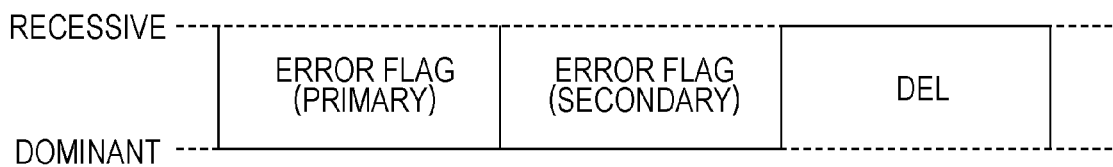
FIG. 3 is a diagram illustrating a format of an error frame specified in the CAN protocol.

FIG. 3 is a diagram illustrating a format of an error frame specified in the CAN protocol. The error frame is configured by an error flag (primary), an error flag (secondary), and an error delimiter.

The error flag (primary) is used for notifying other nodes of occurrence of an error. A node that has detected an error successively transmits 6 bits of dominants in order to notify other nodes of occurrence of the error. Because the transmission violates a bit stuffing rule (6 bits or more of the same value must not be successively transmitted) of the CAN protocol, the other nodes are caused to transmit error frames (secondary).

The error flag (secondary) is configured by 6 consecutive bits of dominants used for notifying other nodes of occurrence of an error. All nodes that have received an error flag (primary) and detected a violation of the bit stuffing rule transmit error flags (secondary).

The error delimiter "DEL" is 8 consecutive bits of recessives and indicates an end of the error frame.

1.4 Example of MAC Addition Pattern

Figure 4:
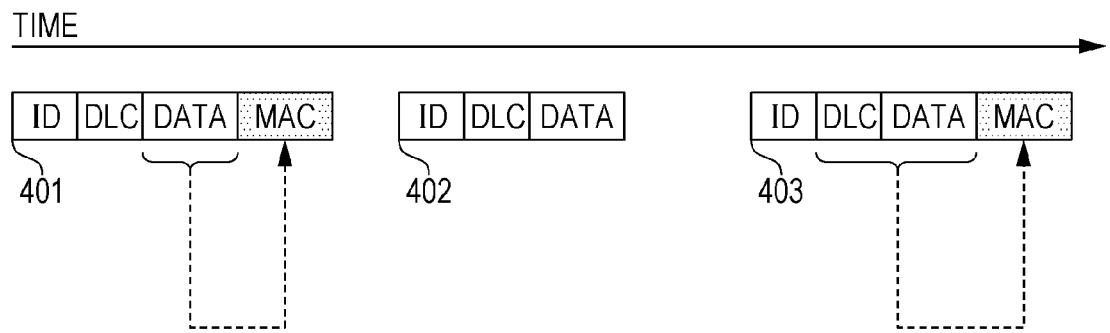
FIG. 4 is a diagram illustrating an example of a pattern relating to addition of MACs to data frames in the first embodiment.

FIG. 4 is a diagram illustrating an example of a pattern relating to addition of MACs to data frames. For example, data frames are sequentially transmitted to the buses 200 from the left to the right of FIG. 4. A MAC is added to a data frame (message) to indicate the authenticity of transmission content. Here, the pattern relating the addition of MACs has various variations depending on whether to add the MACs and fields for which the MACs are to be calculated.

Among three exemplary data frames illustrated in FIG. 4, a left exemplary data frame 401 and a right exemplary data frame 403 each include a MAC and data for which the MAC is to be calculated (that is, data used for calculation for obtaining the MAC). A center exemplary data frame 402 does not include a MAC. Although an example is illustrated here in which whether to add a MAC and whether the data for which a MAC is to be calculated is only a data field or also includes a DLC field are switched for each frame in order to suppress an increase in traffic in the buses or reduce the amount of calculation, other variations are possible. For example, a MAC may be added to every frame, a MAC may be calculated for an ID field, the DLC field, and the data field, a MAC may be calculated for any or some of the ID field, the DLC field, and the data field, or a MAC may be calculated for a combination of one of these fields and another field.

1.5 Configuration of ECU 100a

Figure 5:
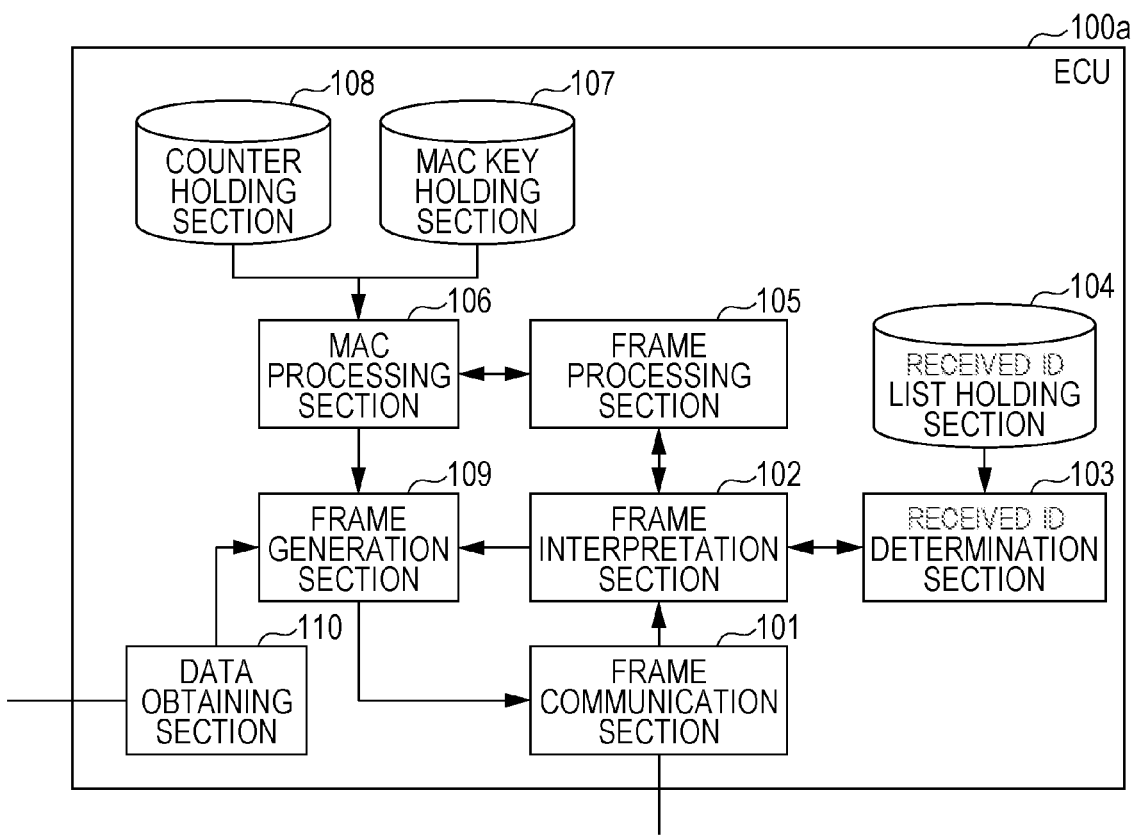
FIG. 5 is a configuration diagram of an ECU according to the first embodiment.

FIG. 5 is a configuration diagram of the ECU 100a. The ECU 100a includes a frame communication section 101, a frame interpretation section 102, a received ID determination section 103, a received ID list holding section 104, a frame processing section 105, a MAC processing section 106, a MAC key holding section 107, a counter holding section 108, a frame generation section 109, and a data obtaining section 110. These components are functional components, and functions thereof are achieved by the communication circuit in the ECU 100a or the processor, the digital circuit, or the like that executes the control program stored in the memory.

The frame communication section 101 transmits and receives frames according to the CAN protocol to and from the buses 200. The frame communication section 101 receives a frame from the buses 200 bit by bit and transfers the frame to the frame interpretation section 102. In addition, the frame communication section 101 transmits the content of a frame transmitted from the frame generation section 109 to the buses 200.

The frame interpretation section 102 receives values of a frame from the frame communication section 101 and performs interpretation in such a way as to map the values in the fields of a frame format specified in the CAN protocol. Values determined to be included in the ID field are transferred to the received ID determination section 103. The frame interpretation section 102 determines, in accordance with a result of a determination transmitted from the received ID determination section 103, whether to transfer the values in the ID field, the DLC, the data field, and the like that appear after the ID field to the frame processing section 105 or stop receiving the frame after receiving the result of the determination (that is, stop interpreting the frame). On the other hand, if determining that the frame is not in accordance with the CAN protocol, the frame interpretation section 102 requests the frame generation section 109 to transmit an error frame. In addition, if receiving an error frame, that is, if interpreting a received frame as an error frame on the basis of values, the frame interpretation section 102 discards the frame thereafter, that is, stop interpreting the frame.

The received ID determination section 103 receives a value of the ID field transmitted from the frame interpretation section 102 and determines, in accordance with a list of message IDs held by the received ID list holding section 104, whether to receive the fields of a frame after the ID field. The received ID determination section 103 transmits a result of the determination to the frame interpretation section 102.

The received ID list holding section 104 holds a received ID list, which is a list of IDs (message IDs) to be received by the ECU 100a. FIG. 6 is a diagram illustrating an example of the received ID list.

The frame processing section 105 receives values of the data field from the frame interpretation section 102 and performs processing according to various flags included in the data field (flags that can function as identifiers relating to data used for the calculation for obtaining a MAC, such as a data field header and a start flag, which will be described later). The processing includes verification of data regarding a MAC (that is, a process for verifying a MAC) and the like for data to which a MAC is added and can also include processing relating to a function according to the data. That is, the frame processing section 105 functions as a verification section that, after the frame communication section 101 receives one or a plurality of data frames, performs the process for verifying a MAC in accordance with various flags (identifiers) of the received data frame(s). In addition, in an example of the processing relating to a function, the ECU 100a connected to the engine 310 has a function of issuing an alarm sound if speed exceeds 30 km per hour with a door open. The frame processing section 105 manages data (e.g., information indicating states of doors) received from other ECUs, and the ECU 100a performs a process for issuing an alarm sound under the certain condition on the basis of the speed per hour obtained from the engine 310. It is to be noted that details (processing flow) of a process for communicating a frame (a process for transmitting a data frame and a process for receiving a data frame) will be described later with reference to FIGS. 14, 15, and 16. Although the data field of a data frame includes various flags here, the various flags may be included in another field such as an extended ID field, instead.

The MAC processing section 106 obtains (obtains through calculation) a MAC value using a MAC key held by the MAC key holding section 107 on the basis of a value (coupling value) obtained by coupling values for calculating a MAC (these are values to be transmitted in a frame as data for which the MAC is to be calculated; e.g., the message ID, a value of the DLC, and values of data for the data field) and a transmission counter value held by the counter holding section 108. The MAC processing section 106 then transmits the MAC, which is an obtained result, to the frame generation section 109. That is, the MAC processing section 106 functions as an obtaining section that obtains a MAC through calculation using data (data for which the MAC is to be calculated) arranged in one or more areas in one or a plurality of frames. The MAC processing section 106 also obtains a MAC value using the key held by the MAC key holding section 107 on the basis of a value (coupling value) obtained by coupling data for which a MAC is to be calculated included in a received frame transmitted from the frame processing section 105 and a reception counter value held by the counter holding section 108. The MAC processing section 106 then transmits the MAC, which is an obtained result, to the frame processing section 105. Here, an hash-based message authentication code (HMAC) (refer to "RFC2104 HMAC: Keyed-Hashing for Message Authentication") is employed as a method for calculating a MAC. The calculation is performed using the MAC key with a value obtained by padding the coupling value up to a certain block (e.g., 4 bytes), and first 4 bytes of a result of the calculation is determined as a MAC. Although an example in which all of the message ID, the value of the DLC, the values of the data, and the transmission counter value or the reception counter value held by the counter holding section 108 are used as the coupling value used for calculating a MAC has been described here, a MAC can be obtained using one or a combination of two or more of these values. That is, when transmitting a frame, the ECU 100a calculates a MAC to be included in the frame to be transmitted using one or a combination of two or more of these values on the basis of a predetermined algorithm for identifying the pattern relating to the addition of MACs illustrated in FIG. 4 as an example. In addition, when receiving a frame, the ECU 100a obtains a MAC on the basis of a predetermined algorithm or, as necessary, by referring to the various flags included in the data field and identifying values necessary to calculate a MAC used for verification.

The MAC key holding section 107 holds MAC keys necessary to calculate a MAC.

The counter holding section 108 holds counter values necessary to calculate a MAC. It is to be noted that the counter values include, for example, a transmission counter value that is held for each message ID and that increments when a frame has been successfully transmitted and a reception counter value that increments when a frame has been successfully received.

The frame generation section 109 configures an error frame in accordance with a notification transmitted from the frame interpretation section 102 indicating transmission of an error frame and transmits the error frame to the frame communication section 101 to cause the frame communication section 101 to transmit the error frame. In addition, when the ECU 100a transmits data while adding a MAC, the frame generation section 109 transmits values of the data transmitted from the data obtaining section 110 and a predetermined message ID to the MAC processing section 106 and receives an obtained MAC. When the ECU 100a transmits data to which a MAC is added, the frame generation section 109 configures, in the memory (transmission buffer), a data frame such that the data frame includes the predetermined message ID, the values of data transmitted from the data obtaining section 110, and the MAC received from the MAC processing section 106, and transmits the data frame to the frame communication section 101. During the transmission, the frame communication section 101 functions as a transmission section that includes a MAC in at least one of one or a plurality of data frames and that transmits the one or plurality of data frames including various flags (identifiers or the like) relating to data used for calculation for obtaining the MAC. It is to be noted that the configuration of the data field of a data frame generated by the frame generation section 109 will be described later with reference to FIGS. 7 and 8.

The data obtaining section 110 obtains data indicating states of devices, sensors, and the like connected to the ECU and transmits the data to the frame generation section 109.

It is to be noted that the ECUs 100*b* to 100*d* have basically the same configuration as the ECU 100*a*. Details of processing relating to a function according to data performed by the frame processing section 105, however, differ between the ECUs. In addition, when the frame communication section 101 of the ECU 100*a* functions as a transmission section that transmits one or a plurality of data frames including various flags, for example, frame communication sections 101 of the ECU 100*b* and the like connected to the buses 200, to which the ECU 100*a* is also connected, function as reception sections that receive the transmitted one or plurality of data frames including the various flags.

1.6 Example of Reception ID List

FIG. 6 is a diagram illustrating an example of the received ID list held by the ECU 100*a*, the ECU 100*b*, the ECU 100*c*, and the ECU 100*d*. The received ID list illustrated in FIG. 6 as an example is used for selectively receiving and processing frames including IDs (message IDs) whose values are 1, 2, 3, or 4.

1.7 First Example of Format of Data Field

FIG. 7 illustrates an example of the format of the data field of a data frame transmitted using the pattern relating to the addition of MACs illustrated in FIG. 4. In this example, an example of a data field including data to which a MAC is not added is indicated. The data field is configured by a data field header 301, a start flag 302, a data size 303, and general data 304.

The data field header 301 includes information indicating a type of data included in the data frame, an area (field type) of data for which a MAC is to be calculated, and the like. The data configuration of the data field header 301 will be described later with reference to FIG. 9.

The start flag 302 is a flag identifying a type of data thereafter (that is, data to be received after the start flag). An example of the content of the start flag 302 will be described later with reference to FIG. 12.

The data size 303 indicates the size of data identified by the start flag 302. The data length of the data size 303 is 6 bits.

The general data 304 indicates an area of data for which a MAC is not to be calculated (that is, data for which a MAC is not to be calculated and that is not the MAC in the data stored in the data field).

1.8 Second Example of Format of Data Field

FIG. 8 illustrates an example of the format of the data field of a data frame transmitted using the pattern relating to the addition of MACs illustrated in FIG. 4. In this example, an example of a data field including a data for which a MAC is to be calculated and the MAC is indicated. The data field is configured by a data field header 301, start flags 302, data sizes 303, MAC calculation data 305, and a MAC 306. The same elements as those illustrated in FIG. 7 are given the same reference numerals, and description thereof is omitted here.

The MAC calculation data 305 indicates an area of data for which a MAC is to be calculated.

The MAC 306 indicates an area in which a MAC obtained through calculation using data for which the MAC is to be calculated and the like is arranged.

1.9 Example of Data Configuration of Data Field Header 301

FIG. 9 illustrates a data configuration of the data field header 301. The data field header 301 is set at a top of the data field when the frame generation section 109 transmits a data frame.

The data field header 301 is configured by reserved bits 311 (2 bits), a MAC calculation target field type 312 (3 bits), and a data field configuration type 313 (3 bits) and 8 bits in total.

The reserved bits 311 are a value of 00 and a fixed value.

Specific data included in the MAC calculation target field type 312 and the data field configuration type 313 will be described hereinafter with reference to FIGS. 10 and 11.

1.10 MAC Calculation Target Field Type 312

FIG. 10 illustrates an example of the content of the MAC calculation target field type 312 included in the data field header 301. In FIG. 10, values are expressed as 3-bit values (binary numbers).

A highest bit of the MAC calculation target field type 312, which includes 3 bits, indicates whether the ID field (refer to FIG. 2) is included as a field in which data for which a MAC is to be calculated is arranged. If a MAC is to be calculated for the ID field, the highest bit is 1, and if a MAC is not to be calculated for the ID field, the highest bit is 0. A middle bit of the MAC calculation target field type 312 indicates whether the DLC is included as a field in which data for which a MAC is to be calculated is arranged. If a MAC is to be calculated for the DLC, the middle bit is 1, and if a MAC is not to be calculated for the DLC, the middle bit is 0. In addition, a lowest bit of the MAC calculation target field type 312 indicates whether the data field is included as a field in which data for which a MAC is to be calculated is arranged. If a MAC is to be calculated for the data field, the lowest bit is 1, and if a MAC is not to be calculated for the data field, the lowest bit is 0.

1.11 Data Field Configuration Type 313

FIG. 11 illustrates an example of the content of the data field configuration type 313 included in the data field header 301. In FIG. 11, values are expressed as 3-bit values (binary numbers).

A highest bit (hereinafter referred to as a "MAC bit") of the data field configuration type 313, which includes 3 bits, indicates whether the data field includes a MAC. The MAC bit is 1 if the data field includes a MAC and 0 if the data field does not include a MAC. A middle bit (hereinafter referred to as a "MAC calculation data bit") of the data field configuration type 313 indicates whether the data field includes data for which a MAC is to be calculated (that is, whether the data field includes the MAC calculation data 305 illustrated in FIG. 8). The MAC calculation data bit is 1 if the data field includes data for which a MAC is to be calculated and 0 if the data field does not include data for which a MAC is to be calculated. The MAC calculation data bit in a transmitted data frame indicates whether the data field of the data frame includes an area of data used for calculation for obtaining a MAC. In addition, a lowest bit (hereinafter referred to as a "general data bit") of the data field configuration type 313 indicates whether the data field includes general data for which a MAC is not to be calculated (that is, whether the data field includes the general data 304 illustrated in FIG. 7). The general data bit is 1 if the data field includes general data and 0 if the data field does not include general data. It is to be noted that in FIG. 11, an example of the content of all patterns that can be represented by a 3-bit value, which is a combination of the MAC bit, the MAC calculation data bit, and the general data bit, is illustrated for the sake of convenience. Some values in the example of the content illustrated in FIG. 11 ("only MAC calculation data" and "general data +MAC calculation data"), therefore, can be used in a second embodiment, which will be described later, but are not used in the first embodiment.

1.12 Start Flag 302

FIG. 12 illustrates an example of the content of the start flag 302, which indicates a start position and a type of data included in the data field. The start flag 302 is set in the data field when the frame generation section 109 transmits a data frame. A position at which the start flag 302 is set is, for example, a position after the data field header 301 or a position after data (general data, data for which a MAC is to be calculated, or a MAC) arranged in the data field (refer to FIGS. 7 and 8).

The start flag 302 is configured by 2 bits and indicates the type of data following the data size 303 (refer to FIGS. 7 and 8) after the start flag 302.

If the data following the data size 303 after the start flag 302 is general data, which is data for which a MAC is not to be calculated, 00 (2-bit value) is set as a value of the start flag 302. If the data following the data size 303 after the start flag 302 is data for which a MAC is to be calculated (MAC calculation data), 01 (2-bit value) is set as the value of the start flag 302. In a transmitted data frame, the start flag 302 of 01 (2-bit value) and the following data size 303 indicate an area of data used for calculation for obtaining a MAC. If the data following the data size 303 after the start flag 302 is a MAC, 10 (2-bit value) is set as the value of the start flag 302.

1.13 Example of Frames Transmitted by ECU 100a Relating to Engine

FIG. 13 is a diagram illustrating an example of IDs (message IDs) and the content (data) of data fields of data frames transmitted by the ECU 100a connected to the engine 310. The message ID of a frame transmitted by the ECU 100a is 1. The content (data) of each data field is divided into 1-byte pieces with spaces and expressed as hexadecimal numbers in FIG. 13. A first 1 byte in each row in the example illustrated in FIG. 13 is the data field header 301, and a next (second) 1 byte is the start flag 302 and the data size 303. A next (third) 1 byte is the MAC calculation data 305 indicating speed per hour (km/h) (the general data 304 in a second row), and a next (fourth) 1 byte in first and third rows in the example illustrated in FIG. 13 is the start flag 302 and the data size 303. Subsequent 4 bytes are the MAC 306. The speed per hour (km/h) ranges from 0 (km/h) at lowest to 180 (km/h) at highest. The highest to lowest rows illustrated in FIG. 13 indicate message IDs and the content (data) of data fields corresponding to the frames sequentially transmitted by the ECU 100a in accordance with the pattern relating to the addition of MACs illustrated in FIG. 4 and that the speed per hour increases 1 km/h at a time from 0 km/h.

1.14 Process for Transmitting Data Frame

Figure 14:
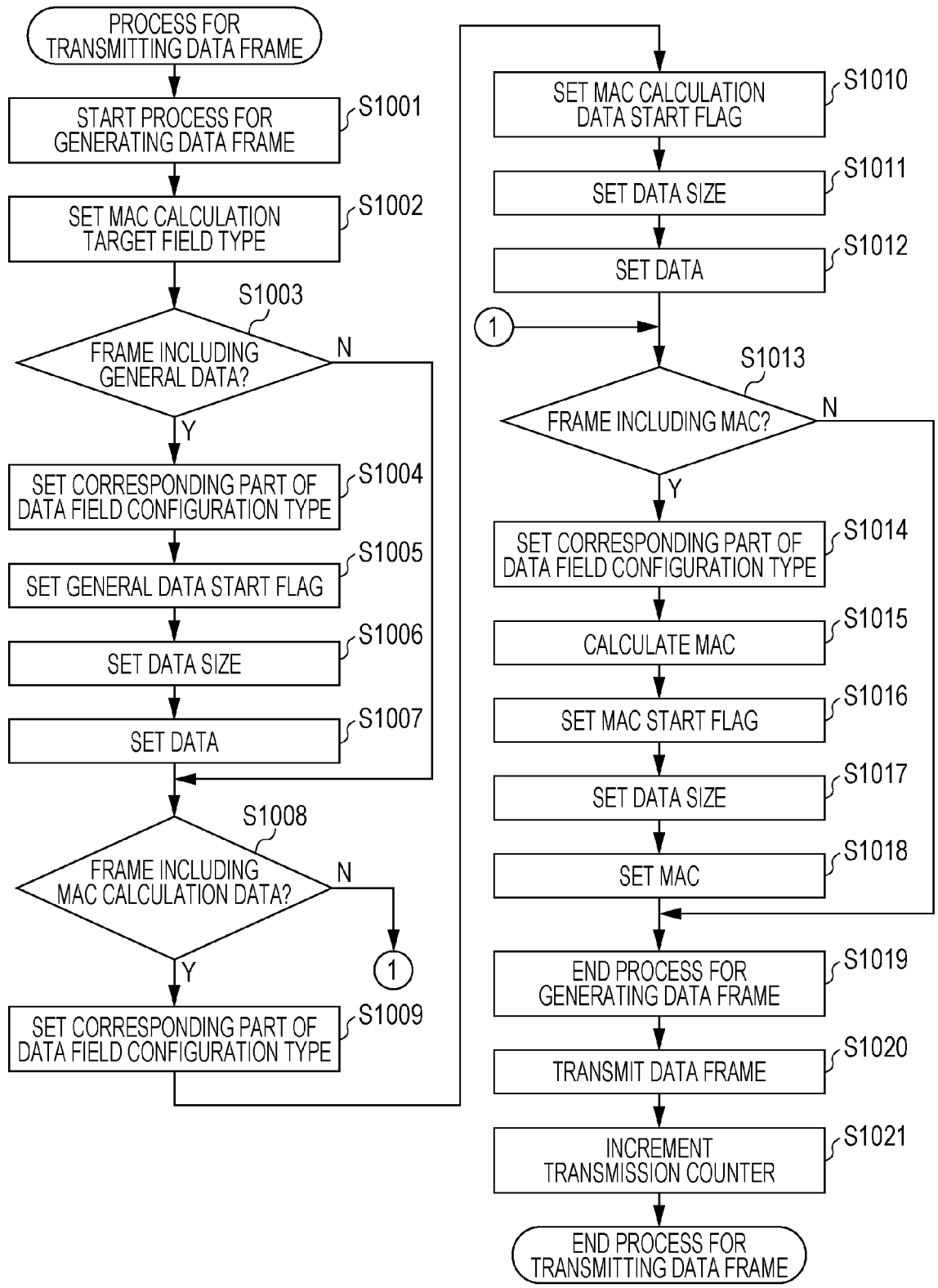
FIG. 14 is a flowchart illustrating a process for transmitting a data frame performed by the ECU.

FIG. 14 is a flowchart illustrating the process for transmitting a data frame performed by the ECU 100a. The process for transmitting a data frame performed by the ECU 100a will be described hereinafter with reference to FIG. 14. Although the content of a data frame to be transmitted differs, the ECUs 100b to 100d, too, perform the same process for transmitting a data frame performed by the ECU 100a. The ECU 100a regularly performs the process for transmitting a data frame.

The ECU 100a obtains a state of the engine 310. If identifying data (data to be transmitted) indicating the state, the ECU 100a causes the frame generation section 109 to start a process for generating a data frame (step S1001). What kind of frame arrangement achieved by what kind of data configuration of data frames is used for sequentially transmitting sequentially obtained data to be transmitted is determined in accordance with a certain algorithm predetermined in the vehicle network system 10. An example of the certain algorithm that determines the frame arrangement and the data configuration is, as in the above-described example illustrated in FIG. 4, for example, an algorithm in which transmission is performed with a data field of the data frame 401, which is transmitted in a first one of three transmission operations as a set, including the MAC calculation data 305 indicating speed per hour and a MAC obtained through calculation using the MAC calculation data 305, a data field of the data frame 402, which is transmitted in a second transmission operation, including the general data 304 indicating speed per hour, and a data field of the data frame 403, which is transmitted in a third transmission operation, including the MAC calculation data 305 indicating speed per hour and a MAC obtained through calculation using the DLC and the MAC calculation data 305.

As the process for generating a data frame, the frame generation section 109 sets values indicating the configuration of data to be transmitted determined on the basis of the certain algorithm to corresponding parts of the MAC calculation target field type 312 in the data field header 301 in a data field of a data frame set in the memory (transmission buffer) (step S1002). For example, in the case of the data frame 403 transmitted in the third transmission operation in the set of three transmission operations (refer to FIG. 4), the bits of the MAC calculation target field type 312 (3 bits) corresponding to the DLC and the data field are set to 1.

The frame generation section 109 of the ECU 100a determines whether a data frame to be transmitted including the data to be transmitted is a frame including the general data 304 (that is, data for which a MAC is not to be calculated) (step S1003). If the data frame to be transmitted does not include the general data 304, processing relating to general data (steps S1004 to S1007) is skipped.

If determining in step S1003 that the data frame to be transmitted includes the general data 304, the frame generation section 109 sets 1 to the general data bit of the data field configuration type 313 in the data field header 301 of the data frame set in the transmission buffer (step S1004).

The frame generation section 109 then sets 00 (2-bit value) indicating general data in the data field of the data frame set in the transmission buffer as the start flag 302 (step S1005). The frame generation section 109 also sets a value according to the size of the general data 304 as the data size 303 (step S1006) and the general data 304 (step S1007).

In addition, the frame generation section 109 determines whether the data frame to be transmitted including the data to be transmitted is a frame including the MAC calculation data 305 (that is, data for which a MAC is to be calculated) (step S1008). If the data frame to be transmitted does not include the MAC calculation data 305, processing relating to MAC calculation data (steps S1009 to S1012) is skipped.

If determining in step S1008 that the data frame to be transmitted includes the MAC calculation data 305, the frame generation section 109 sets 1 to the MAC calculation data bit of the data field configuration type 313 in the data field header 301 of the data frame set in the transmission buffer (step S1009).

The frame generation section 109 then sets 01 (2-bit value) indicating MAC calculation data in the data field of the data frame set in the transmission buffer as the start flag 302 (step S1010). The frame generation section 109 also sets a value according to the size of the MAC calculation data 305 as the data size 303 (step S1011) and the MAC calculation data 305 (step S1012).

In addition, the frame generation section 109 determines whether the data frame to be transmitted including the data to be transmitted is a frame including the MAC 306 (step S1013). If the data frame to be transmitted does not include the MAC 306, processing relating to a MAC (steps S1014 to S1018) is skipped.

If determining in step S1013 that the data frame to be transmitted includes the MAC 306, the frame generation section 109 sets 1 to the MAC bit of the data field configuration type 313 in the data field header 301 of the data frame set in the transmission buffer (step S1014).

The frame generation section 109 then transmits the data determined on the basis of the certain algorithm as data for which a MAC is to be calculated (that is, the data based on the value set to the MAC calculation target field type 312) to the MAC processing section 106, and the MAC processing section 106 calculates a MAC (step S1015). The MAC processing section 106 obtains a MAC value to be set as the MAC 306 in the data frame to be transmitted by performing calculation, using the MAC key held by the MAC key holding section 107, on a value obtained by coupling the data for which a MAC is to be calculated transmitted from the frame generation section 109 and the transmission counter value held by the counter holding section 108.

The frame generation section 109 then sets 10 (2-bit value) indicating a MAC in the data field of the data frame set in the transmission buffer as the start flag 302 (step S1016). The frame generation section 109 also sets a value according to the size of the MAC 306 as the data size 303 (step S1017) and the MAC 306 (step S1018).

After the processing in step S1018 ends or the processing relating to a MAC is skipped, the frame generation section 109 ends the process for generating a data frame, which is performed to generate a data frame to be transmitted, and notifies the frame communication section 101 of the ending (step S1019).

The frame communication section 101 transmits the data frame generated by the frame generation section 109 in the transmission buffer to the buses 200 (step S1020). If the frame is successfully transmitted, the transmission counter value increments (increases by 1) (step S1021).

1.15 Process for Receiving Data Frame

Figure 15:
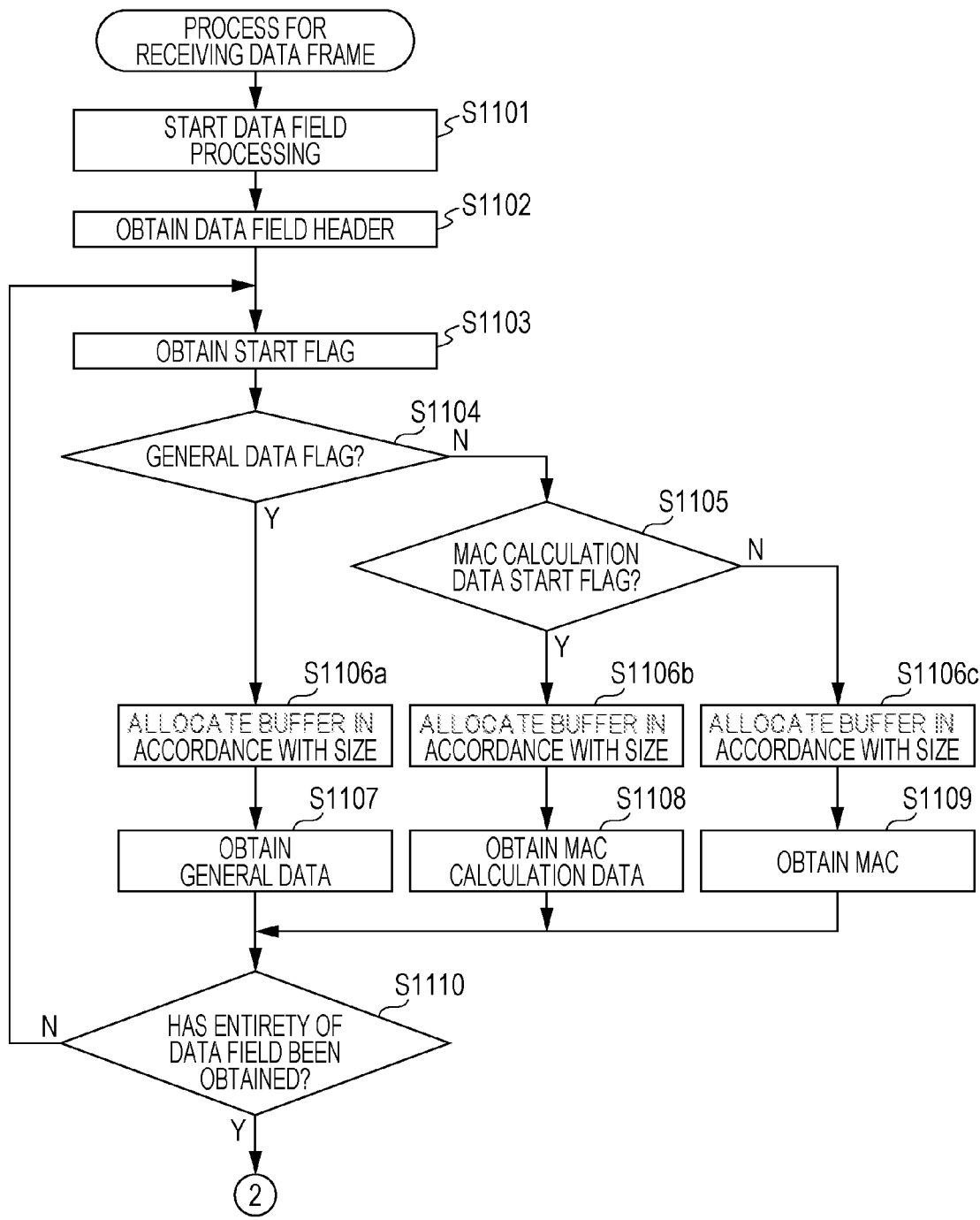
FIG. 15 is a flowchart illustrating a process for receiving a data frame performed by an ECU (continues to FIG. 16)
Figure 16:
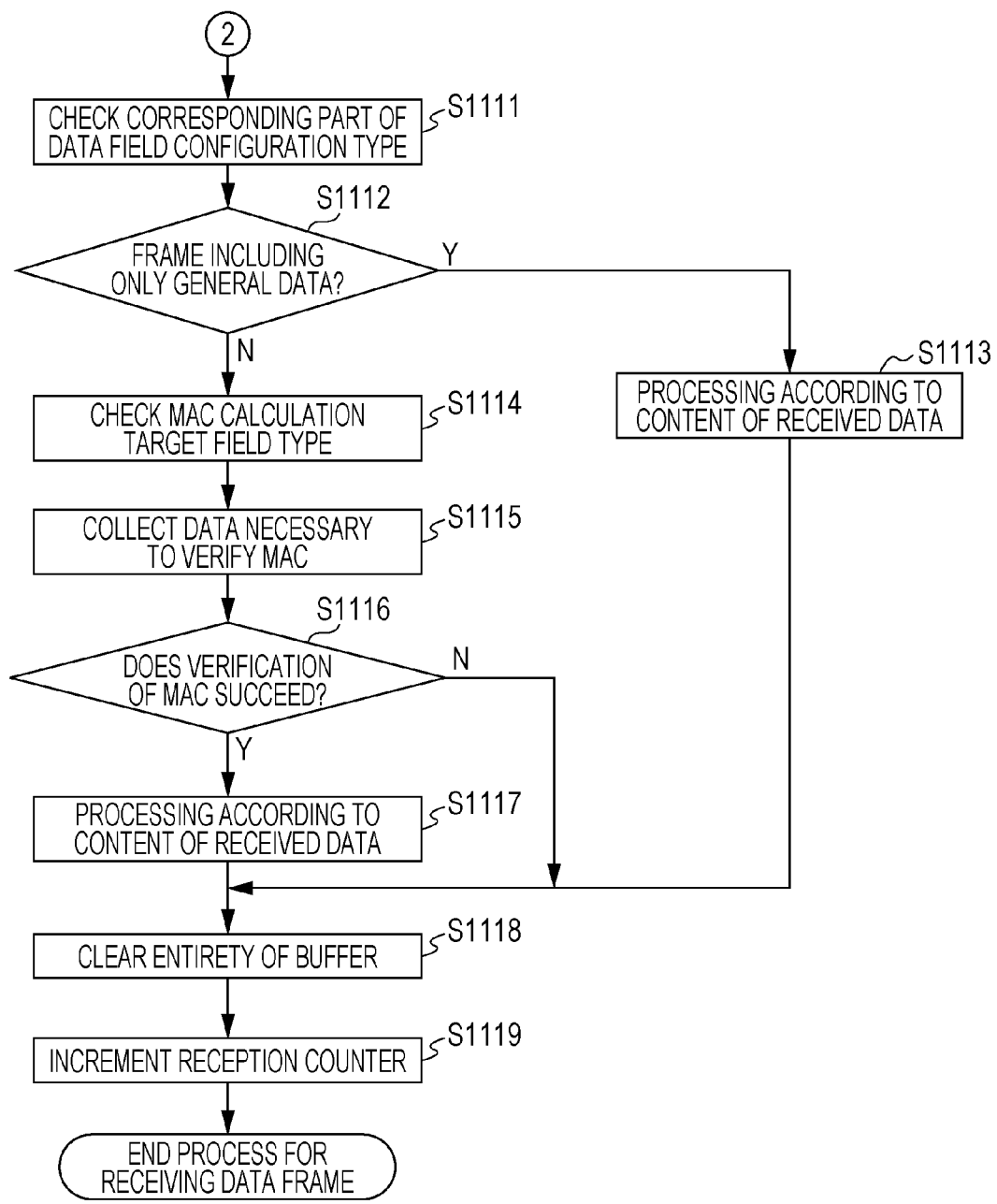
FIG. 16 is a flowchart illustrating the process for receiving a data frame performed by the ECU (continued from FIG. 15)

FIGS. 15 and 16 are flowcharts illustrating the process for receiving a data frame performed by the ECU 100b. The process for receiving a data frame performed by the ECU 100b will be described hereinafter with reference to FIGS. 15 and 16. It is to be noted that the ECUs 100a, 100c, and 100d perform the same process for receiving a data frame performed by the ECU 100b.

If a frame is transmitted to the buses 200, the ECU 100b starts the process for receiving a data frame.

The ECU 100b receives the data frame from the buses 200 bit by bit in accordance with the CAN protocol and receives a data field after receiving and processing an ID and the like of the data frame. At this time, the frame interpretation section 102 transfers the ID, a DLC, the data field, and the like to the frame processing section 105, and the frame processing section 105 starts data processing relating to the data field (step S1101).

The frame processing section 105 of the ECU 100b obtains the data field header 301 in the data field of the received data frame and saves the data field header 301 to a buffer as a working memory area (step S1102). The frame processing section 105 also obtains the start flag 302 in the data field and stores the start flag 302 in the buffer (step S1103).

The frame processing section 105 then determines whether a value of the obtained start flag 302 is 00 (2 bits) indicating the general data 304, 01 (2 bits) indicating the MAC calculation data 305, or another value (indicates a MAC) (steps S1104 and S1105).

Next, the frame processing section 105 obtains the data size 303 following the start flag 302 and allocates a buffer in accordance with size (step S1106a, S1106b, or S1106c). If the start flag 302 indicates the general data 304, the frame processing section 105 then obtains the general data 304 and stores the general data 304 in the allocated buffer (step S1107). If the start flag 302 indicates the MAC calculation data 305, the frame processing section 105 obtains the MAC calculation data 305 and stores the MAC calculation data 305 in the allocated buffer (step S1108). In other cases, the frame processing section 105 obtains the MAC 306 and stores the MAC 306 in the allocated buffer (step S1109).

The frame processing section 105 determines on the basis of the DLC and the data field whether all data in the received data field has been obtained, and repeats the processing in steps S1103 to S1109 until all the data in the data field is obtained (step S1110).

If all the data in the data field is obtained, the frame processing section 105 checks the configuration of the received data frame on the basis of the data field configuration type 313 included in the data field header 301 (step S1111). If determining that the received data frame is a frame including only the general data 304 (that is, a data frame in which the general data bit of the data field configuration type 313 is 1 and the other two bits are 0) (step S1112), the frame processing section 105 performs predetermined processing (processing relating to a function according to data) in accordance with the content of the received data (step S1113).

If the received data frame is not a frame including only the general data 304, the frame processing section 105 checks the MAC calculation target field type 312 included in the data field header 301 (step S1114). The frame processing section 105 then obtains the values of the fields storing data for which a MAC is to be calculated in accordance with the checked MAC calculation target field type 312 to collect data necessary to verify a MAC (step S1115).

The frame processing section 105 performs a process for verifying a MAC using a MAC value obtained by transmitting the collected data necessary to verify a MAC to the MAC processing section 106. If the verification succeeds (step S1116), the frame processing section 105 performs predetermined processing (processing relating to a function according to data) in accordance with the content of the received data (step S1117). It is to be noted that the MAC processing section 106 obtains a MAC value by performing calculation, using the key held by the MAC key holding section 107, on a value obtained by coupling the data (data for which a MAC is to be calculated) obtained from the frame processing section 105 and the reception counter value held by the counter holding section 108 and transmits a MAC, which is an obtained result, to the frame processing section 105. The frame processing section 105 then verifies the MAC by determining whether the value of the MAC 306 in the data field of the received data frame and the MAC calculated by the MAC processing section 106 match. If so, the verification succeeds, and if not, the verification fails.

If the verification does not succeed in step S1116, the frame processing section 105 skips the processing (step S1117) relating to a function according to data in the data field of the received data frame.

After the processing in step S1117 ends or is skipped, the frame processing section 105 clears the entirety of the buffer (step S1118) and increments (increases by 1) the reception counter value (step S1119).

1.16 Advantageous Effects Produced by First Embodiment

In the vehicle network system 10 described in the first embodiment, the data field header 301, the start flag 302, and the like that can function as identifiers relating to data used for calculation for obtaining a MAC are included in a data field of a data frame communicated between a plurality of ECUs to arbitrarily determine the configuration of data stored in the data field. As a result, for example, a data frame storing a MAC in a data field thereof and a data frame that does not store a MAC in a data field thereof can be successively transmitted, and an increase in traffic in the buses can be suppressed compared to when MACs are invariably stored in the data frames. It is to be noted that even when a data frame including the MAC calculation data 305 to which the MAC 306 is added and a data frame including the general data 304, to which a MAC need not be added, are transmitted as frames of the same ID (message ID), the MAC calculation data 305 and the general data 304 can be certainly distinguished with the data field header 301, the start flag 302, and the like, thereby preventing the general data 304 or the like from being erroneously subjected to the process for verifying a MAC.

Second Embodiment

A vehicle network system (hereinafter referred to as a "vehicle network system 11") including an ECU that achieves a transmission method or a reception method for verifying data using a MAC and efficiently communicating data will be described hereinafter with reference to the drawings as an embodiment of the present disclosure.

The vehicle network system 11 is a modification of the vehicle network system 10 described in the first embodiment and is the same as the vehicle network system 10 unless otherwise specified. In the vehicle network system 10, a MAC included in a data frame is obtained through calculation using data in one of fields of the data frame and verified using the data. On the other hand, in the vehicle network system 11 according to the second embodiment, degrees of freedom of the data configuration of the data frame and the arrangement of a data frame are increased such that data for which a MAC is to be calculated (that is, data used for calculation for obtaining a MAC) can be included in a data frame different from that including the MAC.

2.1 Overall Configuration of Vehicle Network System 11

The overall configuration of the vehicle network system 11 is basically the same as that of the vehicle network system 10 according to the first embodiment (refer to FIG. 1), that is, the vehicle network system 11 is configured by including the buses 200 and nodes connected to the buses 200 such as ECUs 2100a to 2100d connected to various devices. It is to be noted that the ECUs 2100a to 2100d refer to modifications of the ECUs 100a to 100d (refer to FIG. 1), respectively, described in the first embodiment. The ECUs 2100a to 2100d are connected to the engine 310, the brake 320, the door open/close sensor 330, and the window open/close sensor 340, respectively. The ECUs 2100a to 2100d can change how a plurality of frames to be executed are processed in accordance with data for which MACs need to be verified, data for which MACs need not be verified, the MACs, and identifiers for identifying data for which the MACs are to be calculated transmitted in data fields of the plurality of frames.

In the vehicle network system 11, too, the ECUs communicate frames in accordance with the CAN protocol.

2.2 Example of MAC Addition Pattern

Figure 17:
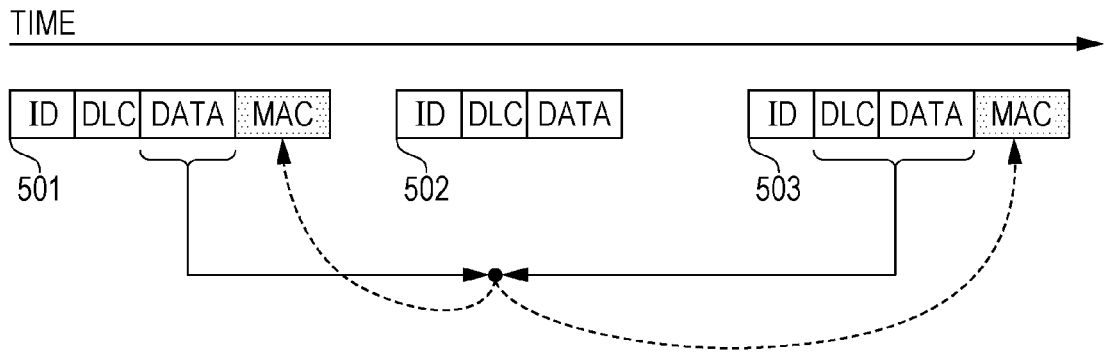
FIG. 17 is a diagram illustrating an example of a pattern relating to addition of MACs to data frames in a second embodiment.

FIG. 17 is a diagram illustrating an example of a pattern relating to addition of MACs to data frames. For example, the data frames are sequentially transmitted to the buses 200 from the left to the right of FIG. 17. Here, the pattern relating to the addition of MACs has various variations depending on whether to add a MAC and a field of a frame for which a MAC is to be calculated. In the example of the three data frames illustrated in FIG. 17, a center exemplary data frame 502 does not include a MAC. In addition, in the example illustrated in FIG. 17, an example is illustrated in which a MAC is calculated from values of data fields included in two or more frames and divided, and resultant MACs are transmitted in frames corresponding to the data for which the MAC has been calculated. That is, an example is illustrated in which a MAC is calculated on the basis of a data field of a left data frame 501 and a DLC and a data field of a right data frame 503, and then a part of the MAC is transmitted in the left data frame 501 and another part of the MAC is transmitted in the right data frame 503.

Although an example is illustrated here in which whether to add a MAC and whether the data for which a MAC is to be calculated is only the data field or also includes the DLC field are switched for each frame in order to suppress an increase in traffic in the buses or reduce the amount of calculation, other variations are possible. For example, a MAC may be added to every frame, a MAC may be calculated for the ID field, the DLC field, and the data field, a MAC may be calculated for one or some of the ID field, the DLC field, and the data field, or a MAC may be calculated for a combination of one of these fields and another field.

2.3 Configuration of ECU 2100a

Figure 18:
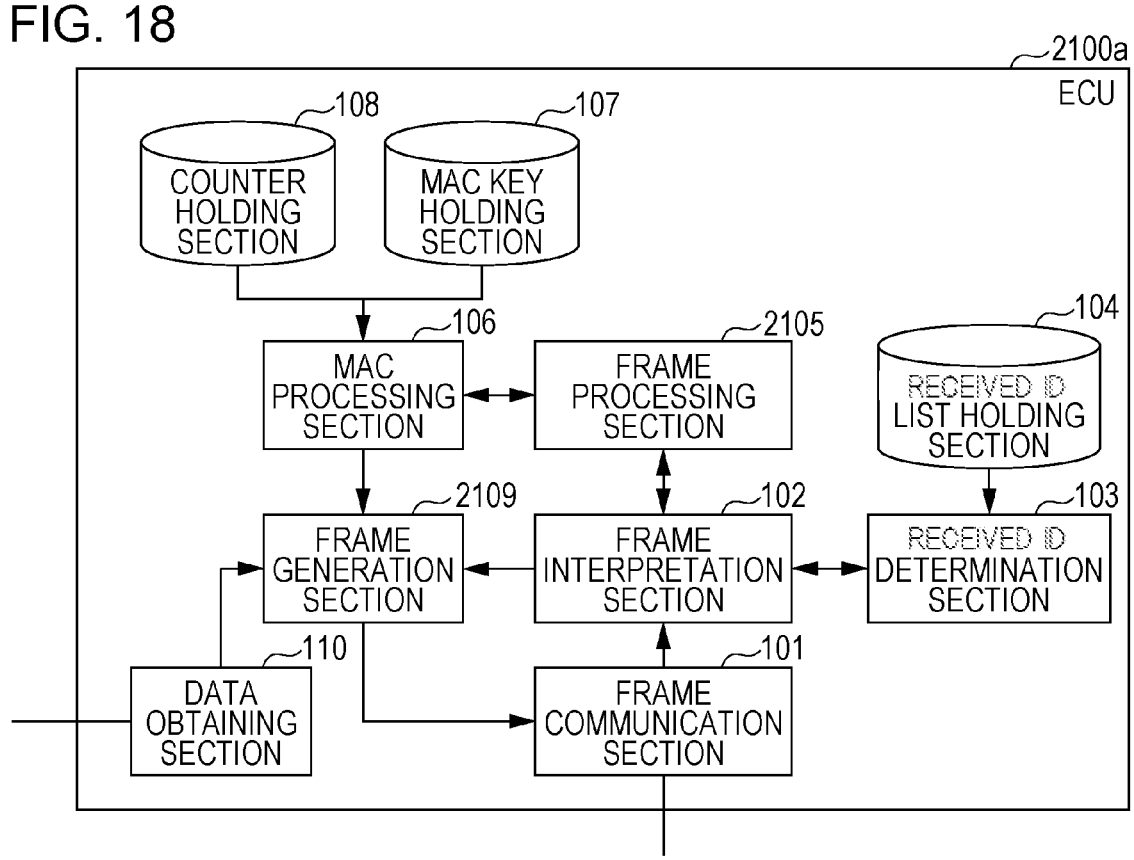
FIG. 18 is a configuration diagram of an ECU according to the second embodiment.

FIG. 18 is a configuration diagram of the ECU 2100a. The ECU 2100a includes the frame communication section 101, the frame interpretation section 102, the received ID determination section 103, the received ID list holding section 104, a frame processing section 2105, the MAC processing section 106, the MAC key holding section 107, the counter holding section 108, a frame generation section 2109, and the data obtaining section 110. These components are functional components, and functions thereof are achieved by a communication circuit in the ECU 2100a or a processor, a digital circuit, or the like that executes a control program stored in a memory. The ECUs 2100b to 2100b have the same configuration. In addition, the same components as those described in the first embodiment (refer to FIG. 5) are given the same reference numerals, and description thereof is omitted.

The frame processing section 2105 is a modification of the frame processing section 105. The frame processing section 2105 receives values of a data field from the frame interpretation section 102 and performs processing according to various flags included in the data field (flags that can function as identifiers relating to data used for calculation for obtaining a MAC, such as a data field header and a start flag). The processing includes verification of data regarding a MAC (that is, a process for verifying a MAC) and the like for data to which the MAC is added and can also include processing relating to a function according to data described in the first embodiment. It is to be noted that details (processing flow) of a process for communicating frames (a process for transmitting data frames and a process for receiving data frames) will be described later with reference to FIGS. 22 to 25. Although a data field of a data frame includes various flags here, the various flags may be included in another field such as an extended ID field, instead.

The frame generation section 2109 is a modification of the frame generation section 109. The frame generation section 2109 configures an error frame in accordance with a notification transmitted from the frame interpretation section 102 indicating transmission of an error frame and transmits the error frame to the frame communication section 101 for transmission. In addition, when the ECU 2100a transmits data while adding a MAC, the frame generation section 2109 transmits values of the data transmitted from the data obtaining section 110 and a predetermined message ID to the MAC processing section 106 and receives an obtained MAC. When the ECU 2100a transmits data to which a MAC is added, the frame generation section 2109 configures, in the memory (transmission buffer), a data frame such that the data frame includes the values of data transmitted from the data obtaining section 110 and the MAC received from the MAC processing section 106, and transmits the data frame to the frame communication section 101. The configuration of a data field of a data frame generated by the frame generation section 2109 will be described later with reference to FIGS. 19 and 20.

2.4 Format of Data Field

A format of a data field of a data frame transmitted to an ECU in the vehicle network system 11 is basically the same as that used in the vehicle network system 10 described in the first embodiment (refer to FIGS. 7 and 8). The data field header 301, however, is replaced by a data field header 2301.

2.5 Example of Data Configuration of Data Field Header 2301

Figure 19:
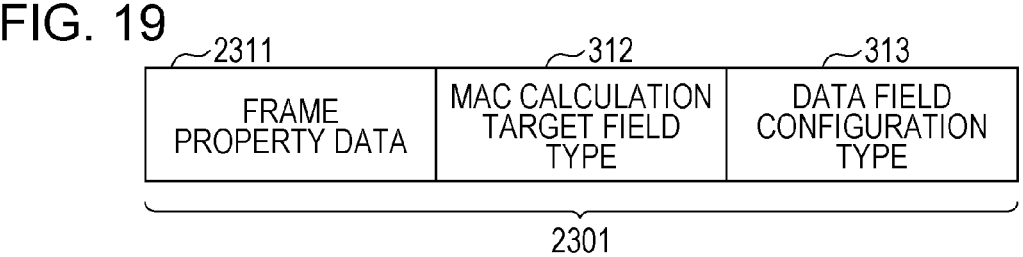
FIG. 19 is a diagram illustrating a data configuration of a data field header in the second embodiment.

FIG. 19 illustrates the data configuration of the data field header 2301. The data field header 2301 is set at a top of a data field when the frame generation section 2109 transmits a data frame.

The data field header 2301 is configured by frame property data 2311 (18 bits), the MAC calculation target field type 312 (3 bits), and the data field configuration type 313 (3 bits) and 24 bits in total.

The MAC calculation target field type 312 and the data field configuration type 313 are the same as in the first embodiment, and description thereof is omitted here (refer to FIGS. 10 and 11).

2.6 Example of Data Configuration of Frame Property Data 2311

FIG. 20 illustrates the data configuration of the frame property data 2311 included in the data field header 2301.

The frame property data 2311 is configured by a frame number (frame No.) 2321, a total number of frames 2322, a number of frames including MAC calculation data 2323, and a number of frames including a MAC 2324 and 18 bits in total.

The frame No. 2321 is a value expressed in 6 bits for distinguishing a group of a series of data frames from another group when data to be transmitted is divided between a plurality of data frames and transmitted. The frame No. 2321 is given by an ECU that transmits data frames such that the same value is added to data frames belonging to a group of a series of data frames generated by dividing data to be transmitted and different values are added to data frames belonging to different groups. The frame No. may be, for example, a serial number and increase each time a group of data frames is transmitted, or may be a random number generated when a group of data frames are to be transmitted. It is to be noted that the frame No. may be zero or the like for data frames that do not include MAC calculation data or a MAC but includes only general data to treat such data frames as exceptions. In the following description, an example will be described as necessary in which the frame No. is zero for data frames including only general data.

The total number of frames 2322 is a value expressed in 4 bits indicating the number of data frames in a group of a series of data frames generated by dividing data to be transmitted. The number of frames including MAC calculation data 2323 is a value expressed in 4 bits indicating the number of frames in the group of the series of data frames including MAC calculation data. The number of frames including a MAC 2324 is a value expressed in 4 bits indicating the number of frames including a MAC among the total number of frames.

2.7 Example of Frames Transmitted by ECU 2100a Relating to Engine

FIG. 21 is a diagram illustrating an example of IDs (message IDs) and the content (data) of data fields of data frames transmitted by the ECU 2100a connected to the engine 310. The message ID of a frame transmitted by the ECU 2100a is "1". The content (data) of each data field is divided into 1-byte pieces with spaces and expressed as hexadecimal numbers in FIG. 21. First 3 bytes in each row in the example illustrated in FIG. 21 are the data field header 2301, and a next (fourth) 1 byte is the start flag 302 and the data size 303. A next (fifth) 1 byte is the MAC calculation data 305 indicating speed per hour (km/h) (the general data 304 in a second row), and a next (sixth) 1 byte in first and third rows in the example illustrated in FIG. 21 is the start flag 302 and the data size 303. Next (seventh) 2 bytes are the MAC 306. The speed per hour (km/h) ranges from 0 (km/h) at lowest to 180 (km/h) at highest. The highest to lowest rows illustrated in FIG. 21 indicate the content (data) of message IDs and data fields corresponding to frames sequentially transmitted by the ECU 2100a in accordance with the pattern relating to the addition of MACs illustrated in FIG. 17 and that the speed per hour increases 1 km/h at a time from 0 km/h.

2.8 Process for Transmitting Data Frames

Figure 22:
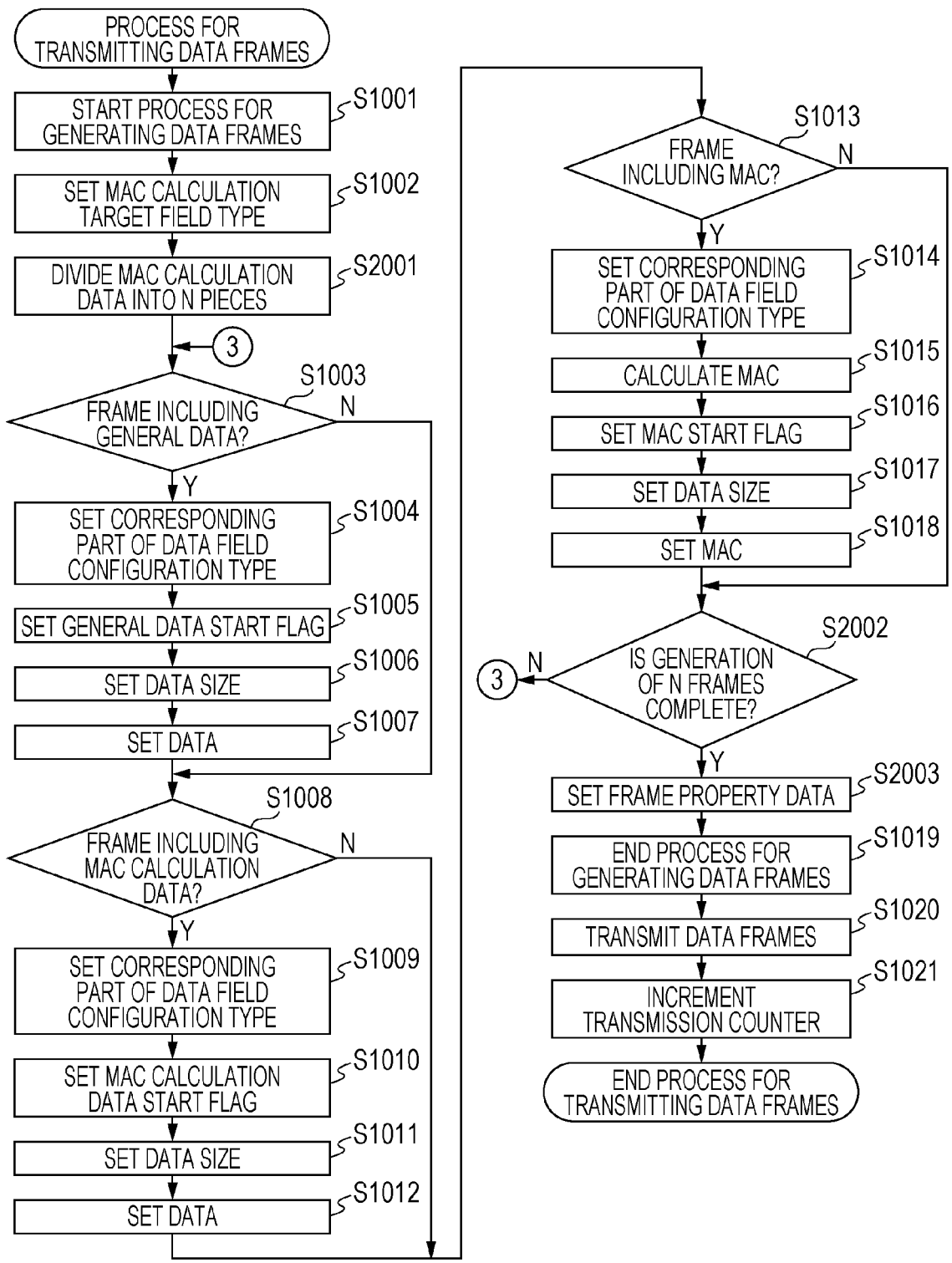
FIG. 22 is a flowchart illustrating a transmission process performed by the ECU.

FIG. 22 is a flowchart illustrating the process for transmitting data frames performed by the ECU 2100a. The process for transmitting data frames performed by the ECU 2100a will be described hereinafter with reference to FIG. 22. It is to be noted that the same processing steps as in the process for transmitting a data frame performed by the ECU 100a according to the first embodiment (FIG. 14) are given the same reference numerals in FIG. 22, and description thereof is simplified as necessary. Although the content of data frames transmitted differs, the ECUs 2100b to 2100d, too, perform the same process for transmitting data frames performed by the ECU 2100a. The ECU 2100a regularly performs the process for transmitting data frames.

The ECU 2100a identifies data to be transmitted and causes the frame generation section 109 to start a process for generating data frames (step S1001). What kind of frame arrangement achieved by what kind of data configuration of data frames is used for sequentially transmitting sequentially obtained data to be transmitted is determined in accordance with a certain algorithm predetermined in the vehicle network system 11. An example of the certain algorithm that determines the frame arrangement and the data configuration is, as in the above-described example illustrated in FIG. 17, for example, an algorithm in which transmission is performed with the data frame 501, which is transmitted in a first one of three transmission operations as a set, and the data frame 503, which is transmitted in a third transmission operation, belonging to the same group, the data field of the data frame 501, which is transmitted in the first transmission operation, including the MAC calculation data 305 indicating the speed per hour and a part (e.g., first 2 bytes) of a MAC obtained through calculation using the MAC calculation data 305 of the data frame 501 and another data frame 503 and the DLC of the other data frame 503, the data field of the data frame 502, which is transmitted in a second transmission operation, including the general data 304 indicating the speed per hour, and the data field of the data frame 503, which is transmitted in the third transmission operation, including the MAC calculation data 305 indicating the speed per hour and a remaining part (e.g., last 2 bytes) of the obtained MAC.

As the process for generating data frames, the frame generation section 2109 sets values indicating the configuration of data to be transmitted determined on the basis of the certain algorithm to corresponding parts of the MAC calculation target field type 312 in the data field header 2301 in the data field of a data frame set in the transmission buffer (step S1002).

The ECU 2100a then divides the data to be transmitted into a number of frames (N) determined in accordance with the certain algorithm in order to transmit the data to be transmitted as a plurality of data frames (step S2001). That is, positions at which the data to be transmitted is divided are identified.

Next, the ECU 2100a repeatedly sets data for the N frames in accordance with the certain algorithm and the data to be transmitted (steps S1003 to S1018) while sequentially focusing upon the data frames (step S2002).

That is, the frame generation section 2109 of the ECU 2100a determines whether a data frame to be transmitted (focused data frame) including the data to be transmitted is a frame including the general data 304 (step S1003). If the data frame to be transmitted does not include the general data 304, the processing relating to general data (steps S1004 to S1007) is skipped. If determining in step S1003 that the data frame to be transmitted includes the general data 304, the frame generation section 2109 sets 1 to the general data bit of the data field configuration type 313 in the data field header 2301 of the data frame set in the transmission buffer (step S1004). The frame generation section 2109 then sets a value indicating general data in the data field of the data frame set in the transmission buffer as the start flag 302 (step S1005). The frame generation section 2109 also sets a value according to the size of the general data 304 as the data size 303 (step S1006) and the general data 304 (step S1007).

In addition, the frame generation section 2109 determines whether the data frame to be transmitted (focused data frame) including the data to be transmitted is a frame including the MAC calculation data 305 (step S1008). If the data frame to be transmitted does not include the MAC calculation data 305, the processing relating to MAC calculation data (steps S1009 to S1012) is skipped. If determining in step S1008 that the data frame to be transmitted includes the MAC calculation data 305, the frame generation section 2109 sets 1 to the MAC calculation data bit of the data field configuration type 313 in the data field header 2301 of the data frame set in the transmission buffer (step S1009). The frame generation section 2109 then sets a value indicating MAC calculation data in the data field of the data frame set in the transmission buffer as the start flag 302 (step S1010). The frame generation section 2109 also sets a value according to the size of the MAC calculation data 305 as the data size 303 (step S1011) and the MAC calculation data 305 (step S1012).

In addition, the frame generation section 2109 determines whether the data frame to be transmitted (focused data frame) including the data to be transmitted is a frame includes the MAC 306 (step S1013). If the data frame to be transmitted does not include the MAC 306, the processing relating to a MAC (steps S1014 to S1018) is skipped. If determining in step S1013 that the data frame to be transmitted includes the MAC 306, the frame generation section 2109 sets 1 to the MAC bit of the data field configuration type 313 in the data field header 301 of the data frame set in the transmission buffer (step S1014).

The frame generation section 2109 then transmits the data determined on the basis of the certain algorithm as data for which a MAC is to be calculated (that is, the data based on the value set to the MAC calculation target field type 312) to the MAC processing section 106, and the MAC processing section 106 obtains a MAC (step S1015). The MAC processing section 106 obtains a MAC value to be set as the MAC 306 in the data frame to be transmitted by performing calculation, using a MAC key held by the MAC key holding section 107, on a value obtained by coupling the data for which a MAC is to be calculated transmitted from the frame generation section 2109 and the transmission counter value held by the counter holding section 108. The frame generation section 2109 then sets a value indicating a MAC in the data field of the data frame set in the transmission buffer as the start flag 302 (step S1016). The frame generation section 2109 also sets a value according to the size of the MAC 306 as the data size 303 (step S1017) and the MAC 306 (step S1018). If the certain algorithm specifies that a MAC be divided and transmitted, the frame generation section 2109, in step S1018, divides the MAC value obtained by the MAC processing section 106 and sets a plurality of resultant MACs 306 to data fields of different data frames.

After the processing in step S1018 ends or the processing relating to a MAC is skipped, the frame generation section 2109 determines whether the generation of the 1 to N data frames, that is, the first to N-th data frames, is complete (step S2002). If not, the processing in steps S1003 to S1018 is repeated while focusing upon one of the N frames that has not yet been focused upon.

If determining in step S2002 that the generation of the N data frames is complete, the frame generation section 2109 sets the frame property data 2311 in the data field headers 2301 of the data frames in accordance with the content of the generated data frames (step S2003). The frame generation section 2109 thus ends the process for generating data frames, which is performed to generate the N data frames to be transmitted, and notifies the frame communication section 101 of the ending (step S1019).

The frame communication section 101 transmits the data frames generated by the frame generation section 2109 in the transmission buffer to the buses 200 (step S1020). If the frames are successfully transmitted, the transmission counter value increments (step S1021).

2.9 Process for Receiving Data Frames

Figure 23:
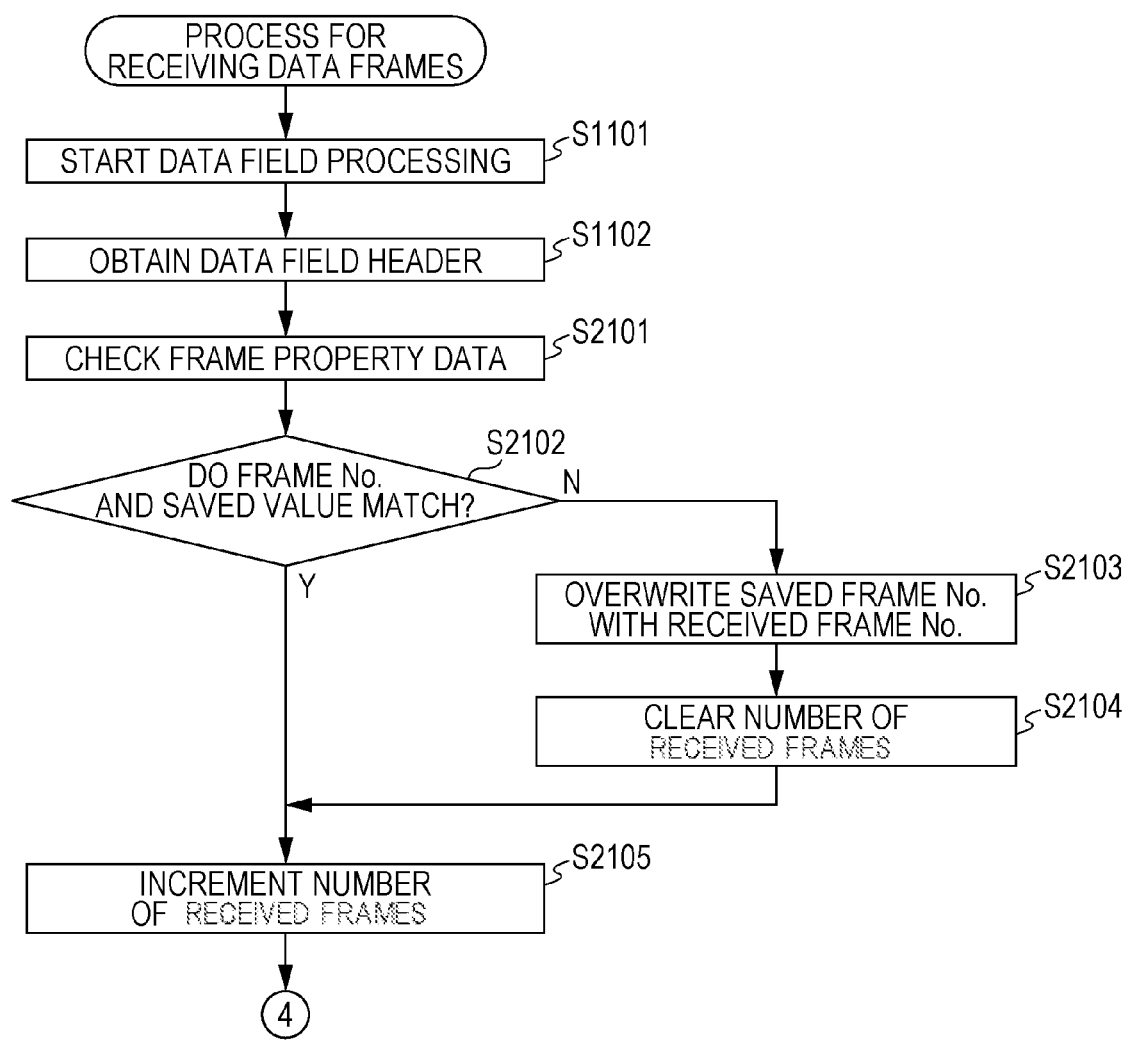
FIG. 23 is a flowchart illustrating a process for receiving data frames performed by an ECU (continues to FIG. 24)
Figure 24:
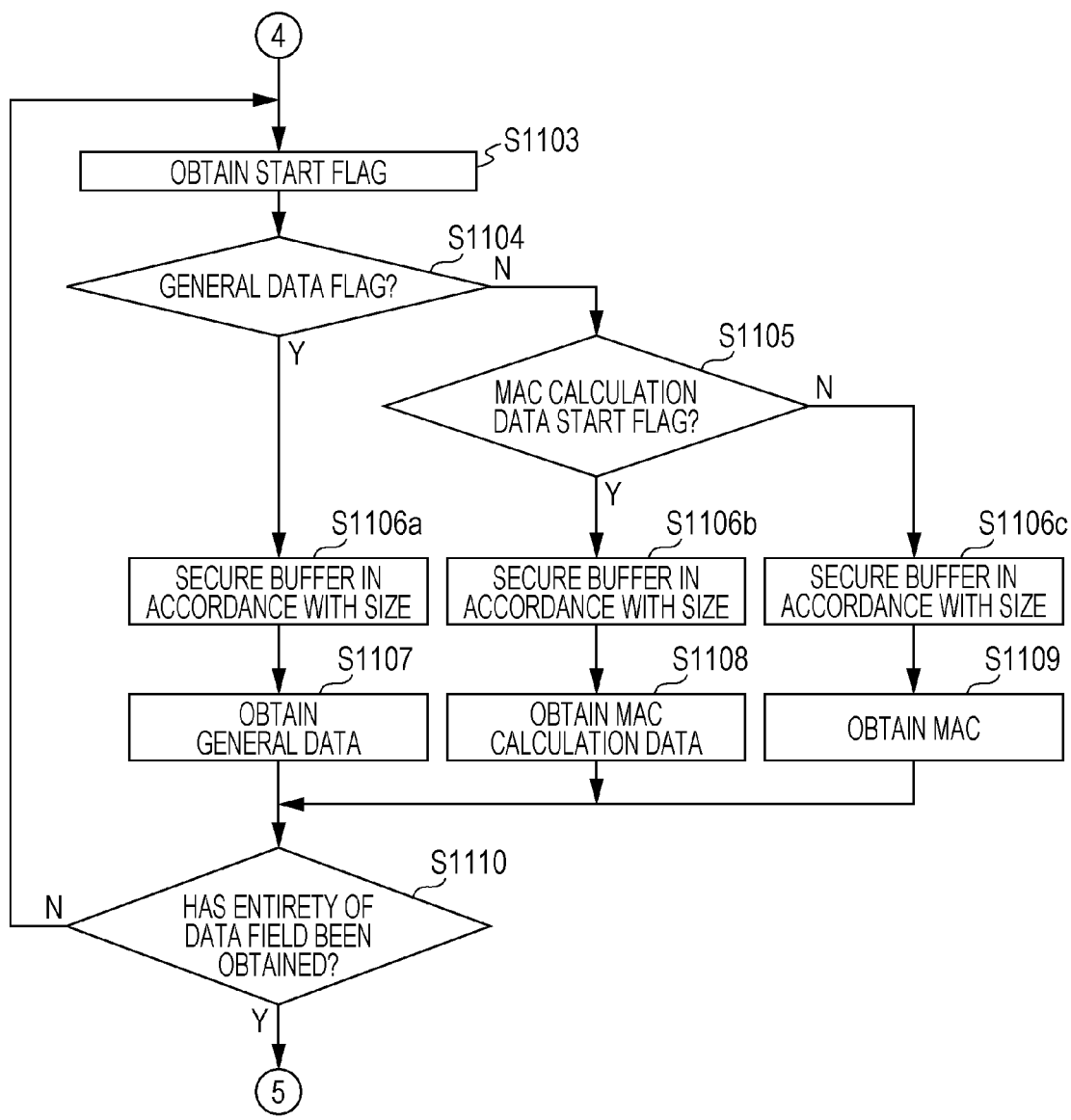
FIG. 24 is a flowchart illustrating the process for receiving data frames performed by the ECU (continues to FIG. 25)
Figure 25:
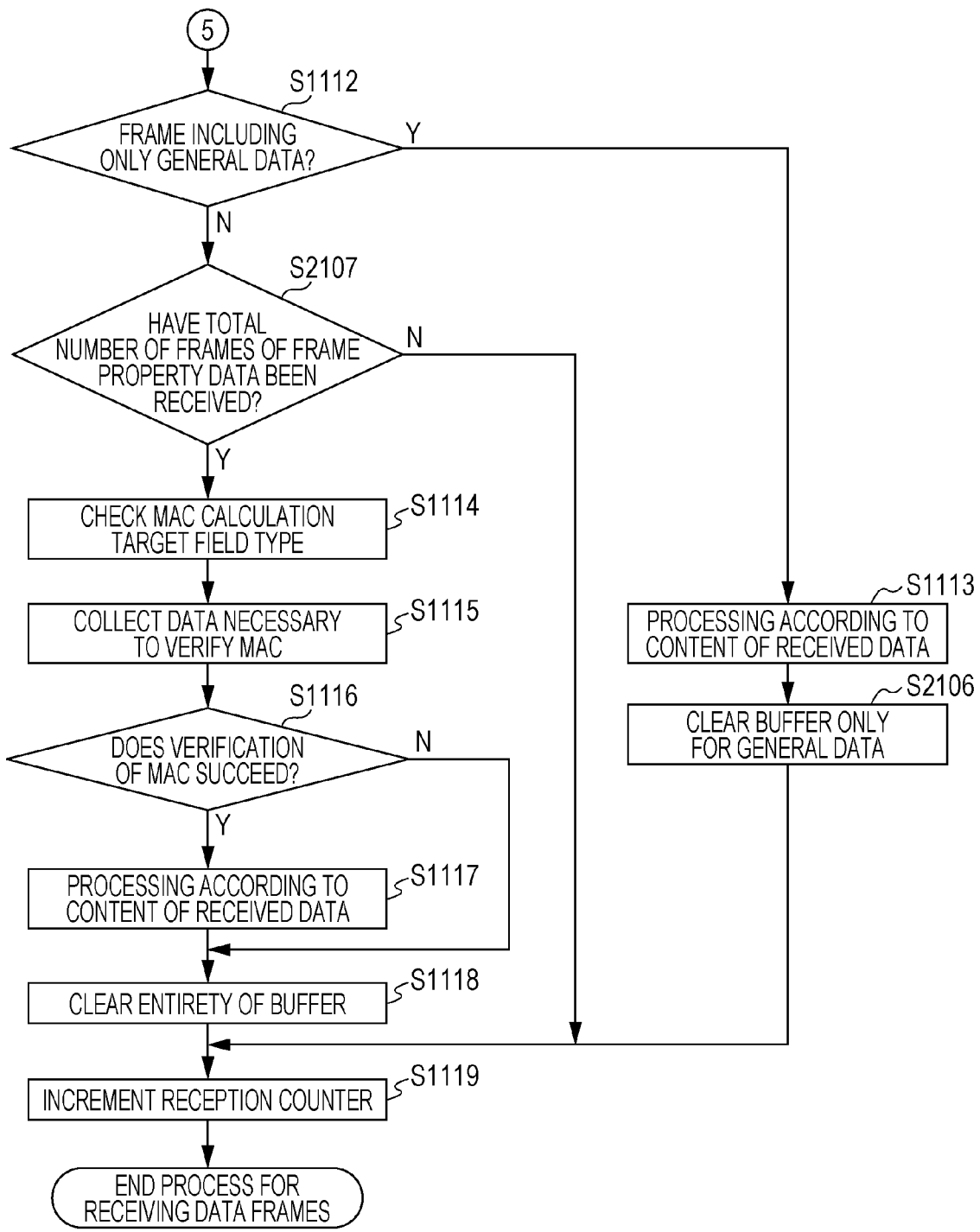
FIG. 25 is a flowchart illustrating the process for receiving data frames performed by the ECU (continued from FIG. 24)

FIGS. 23 to 25 are flowcharts illustrating the process for receiving data frames performed by the ECU 2100b. The process for receiving data frames performed by the ECU 2100b will be described hereinafter with reference to FIGS. 23 to 25. It is to be noted that the same processing steps as in the process for receiving a data frame performed by the ECU 100b according to the first embodiment (FIGS. 15 and 16) are given the same reference numerals in FIGS. 23 to 25, and description thereof is simplified as necessary. It is to be noted that the ECUs 2100*a*, 2100*c*, and 2100*d* perform the same process for receiving data frames performed by the ECU 2100*b*.

If a frame is transmitted to the buses 200, the ECU 2100*b* starts the process for receiving data frames.

The ECU 2100*b* receives a data frame from the buses 200 bit by bit in accordance with the CAN protocol and receives a data field after receiving and processing an ID and the like of the data frame. At this time, the frame interpretation section 102 transfers the data field and the like to the frame processing section 2105, and the frame processing section 2105 starts the data processing relating to the data field (step S1101). It is to be noted that the frame processing section 2105 distinguishes frames with IDs and performs processing on an assumption that a plurality of frames having the same ID can be transmitted as a group.

The frame processing section 2105 of the ECU 2100*b* obtains the data field header 2301 in the data field of the received data frame and saves the data field header 2301 to a buffer as a working memory area (step S1102).

The frame processing section 2105 checks the frame property data 2311 included in the data field header 2301 (step S2101) and determines whether a value of the frame No. 2321 of the frame property data 2311 and a value of a frame No. saved in advance match (step S2102). The frame processing section 2105 thus determines whether the frame including the data field received this time has been transmitted in the same group as that of a previously received data frame. If not, the frame processing section 2105 overwrites the saved frame No. with the received frame No., that is, saves the received frame No. (step S2103) and zero-clears the number of received frames, which is a variable used in the process for receiving data frames (step S2104).

After the frame processing section 2105 determines in step S2102 that the values match or step S2104 is performed, the frame processing section 2105 increments (increases by 1) the number of received frames (step S2105). As a result, the number of received frames indicates which number the data frame received this time is among a plurality of data frames transmitted in the same group. It is to be noted that should the frame No. is zero, the processing in steps S2102 to S2105 may be skipped. In addition, when a plurality of groups of frames need to be transmitted at the same time, the number of received frames may be separately managed for each frame No.

Next, the frame processing section 2105 obtains the start flag 302 in the data field of the received data frame and stores the start flag 302 in the buffer (step S1103).

The frame processing section 2105 then determines whether the value of the obtained start flag 302 indicates the general data 304, the MAC calculation data 305, or another piece of data (indicates a MAC) (steps S1104 and S1105).

Next, the frame processing section 2105 obtains the data size 303 following the start flag 302 and allocates a buffer in accordance with size (step S1106*a*, 51106*b*, or S1106*c*). If the start flag 302 indicates the general data 304, the frame processing section 2105 then obtains the general data 304 and stores the general data 304 in the buffer (step S1107). If the start flag 302 indicates the MAC calculation data 305, the frame processing section 2105 obtains the MAC calculation data 305 and stores the MAC calculation data 305 in the buffer (step S1108). In other cases, the frame processing section 2105 obtains the MAC 306 and stores the MAC 306 in the buffer (step S1109).

The frame processing section 2105 determines on the basis of the DLC and the data field whether all data in the received data field has been obtained, and repeats the processing in steps S1103 to S1109 until all the data in the data field is obtained (step S1110).

If all the data in the data field is obtained, the frame processing section 2105 checks the configuration of the received data frame on the basis of the data field configuration type 313 included in the data field header 2301 to determine whether the received data frame is a frame including only the general data 304 (step S1112). If determining that the received data frame is a frame including only the general data 304, the frame processing section 2105 performs predetermined processing relating to a function in accordance with the content of the received data (step S1113). After step S1113, the frame processing section 2105 clears the buffer storing the general data (step S2106) and increments the reception counter value (step S1119). The process for receiving data frames thus ends.

If determining in step S1112 that the received data frame is not a frame including only the general data 304, the frame processing section 2105 determines on the basis of the number of received frames whether all the data frames in the same group indicated by the total number of frames 2322 of the frame property data 2311 have been received (step S2107). If determining that all the data frames in the same group indicated by the total number of frames 2322 have not yet been received, the frame processing section 2105 increments the reception counter value (step S1119).

On the other hand, if determining in step S2107 that all the data frames in the same group indicated by the total number of frames 2322 have been received, the frame processing section 2105 checks the MAC calculation target field type 312 included in the data field header 2301 (step S1114). The frame processing section 2105 then obtains the value of each field storing data for which a MAC is to be calculated in accordance with the checked MAC calculation target field type 312 (that is, obtains the values of necessary fields of each of data frames that have already been received) to collect data necessary to verify a MAC (step S1115).

The frame processing section 2105 performs a process for verifying a MAC using a MAC value obtained by transmitting the collected data necessary to verify a MAC to the MAC processing section 106. If the verification succeeds (step S1116), the frame processing section 2105 performs predetermined processing (processing relating to a function according to data) in accordance with the content of the received data (step S1117). In steps S1115 and S1116, if types of content of the data field indicated by the various flags that function as identifiers relating to data used for calculation for obtaining a MAC indicate that areas of data used for the calculation for obtaining a MAC are included, the verification process is performed through calculation using the values of the areas (the areas according to the various flags) in the data field used for the calculation for obtaining a MAC.

If the verification does not succeed in step S1116, the frame processing section 2105 skips the processing (step S1117) relating to a function according to data in the data field of the received data frame.

After the processing in step S1117 ends or is skipped, the frame processing section 2105 clear the entirety of the buffer (step S1118) and increments the reception counter value (step S1119).

2.10 Advantageous Effects Produced by Second Embodiment

In the vehicle network system 11 described in the second embodiment, the data field header 2301, the start flag 302, and the like that can function as identifiers relating to data used for calculation for obtaining a MAC are included in a data field of a data frame communicated between a plurality of ECUs to arbitrarily determine the configuration of data stored in the data field. As a result, for example, the MAC calculation data 305 and the MAC 306 arbitrarily divided and arranged between data fields of a plurality of frames can be transmitted while adding the same frame No., thereby achieving flexible data designing and suppressing an increase in traffic in the buses. It is to be noted that even when a data frame including the MAC calculation data 305 to which the MAC 306 is added and a data frame including the general data 304, to which a MAC need not be added, are transmitted as frames of the same ID (message ID), the MAC calculation data 305 and the general data 304 can be certainly distinguished with the data field header 2301, the start flag 302, and the like, thereby preventing the general data 304 or the like from being erroneously subjected to the process for verifying a MAC.

2.11 First Modification of Second Embodiment

Figure 26:
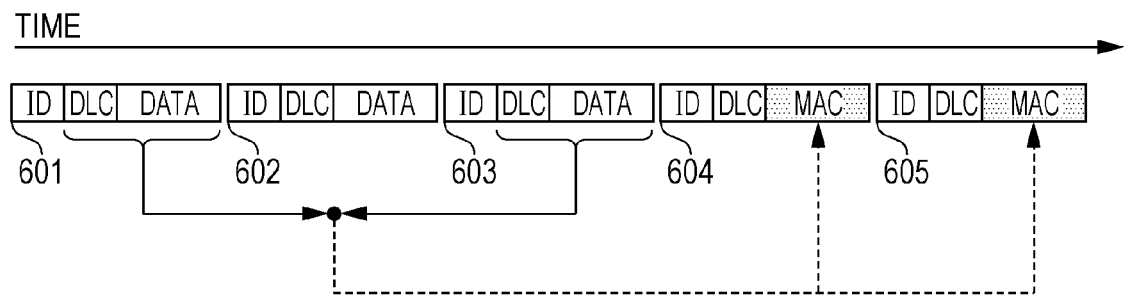
FIG. 26 is a diagram illustrating an example of a pattern relating to addition of MACs to data frames in a first modification of the second embodiment.

The pattern relating to the addition of MACs to data frames illustrated in FIG. 17 in the second embodiment can be modified as in an example illustrated in FIG. 26. For example, data frames are sequentially transmitted to the buses 200 from the left to the right of FIG. 26.

In the example of five data frames illustrated in FIG. 26, an exemplary data frame 602 does not include a MAC or MAC calculation data. In the example illustrated in FIG. 26, a MAC is calculated and obtained from values of data fields included in two or more frames, divided, stored in frames different from those including data for which the MAC has been calculated, and transmitted. That is, in the example, a MAC is calculated and obtained on the basis of a DLC and a data field of a data frame 601 and a DLC and a data field of a data frame 603. A part of the MAC is stored in a data frame 604 and transmitted, and another part of the MAC is stored in a data frame 605 and transmitted.

A certain algorithm that determines frame arrangement and data configuration used in the vehicle network system in accordance with the example illustrated in FIG. 26 is, for example, an algorithm in which transmission is performed with the data frames 601 and 603 to 605, which are transmitted in first and third to fifth ones, respectively, of five transmission operations as a set, belonging to the same group, the data fields of the data frames 601 and 603 including the MAC calculation data 305 indicating values to be transmitted, such as speed per hour, a data field of the data frame 602 including the general data 304 indicating a value to be transmitted, such as speed per hour, a data field of the data frame 604 including a part (e.g., first 2 bytes) of a MAC obtained through calculation using the MAC calculation data 305 and the DLCs of the data frames 601 and 603, and a data field of the data frame 605 including a remaining part (e.g., last 2 bytes) of the obtained MAC. The certain algorithm can be modified in various ways. In addition, the values to be transmitted separately included in the data frames need not be temporally separately generated or obtained but may be collectively generated or obtained or simultaneously separately generated or obtained. In addition, the data frames need not regularly (that is, at certain time intervals) be transmitted.

It is to be noted that the configuration and operation of ECUs in the vehicle network system in a first modification are the same as those of the ECUs 2100a to 2100d except that the content of the certain algorithm that determines the frame arrangement and the data configuration is changed in accordance with the example of the pattern relating to the addition of MACs illustrated in FIG. 26. If obtaining of a MAC in a succeeding data frame is made possible as the certain algorithm that determines the frame arrangement and the data configuration in accordance with the example illustrated in FIG. 26 using a field (an ID field or a DLC) of a preceding data frame other than a data field, however, the process for receiving data frames may be modified in the following manner. That is, if determining in step S2107 (FIG. 25) in the process for receiving data frames that the data frames in the same group indicated by the total number of frames 2322 have not been received, the frame processing section 2105 may store the content of the ID field or the DLC in the buffer so that the ID field or the DLC can be used for the calculation for obtaining a MAC in a frame that will be received later.

2.12 Advantageous Effects Produced by First Modification of Second Embodiment In the vehicle network system according to the first modification, a frame including the MAC calculation data 305 and a frame including the MAC 306 calculated from the MAC calculation data 305 can be separately transmitted. As a result, a frame processing load in unit time can be reduced (dispersed) in ECUs on transmission and reception sides.

2.13 Second Modification of Second Embodiment

Figure 27:
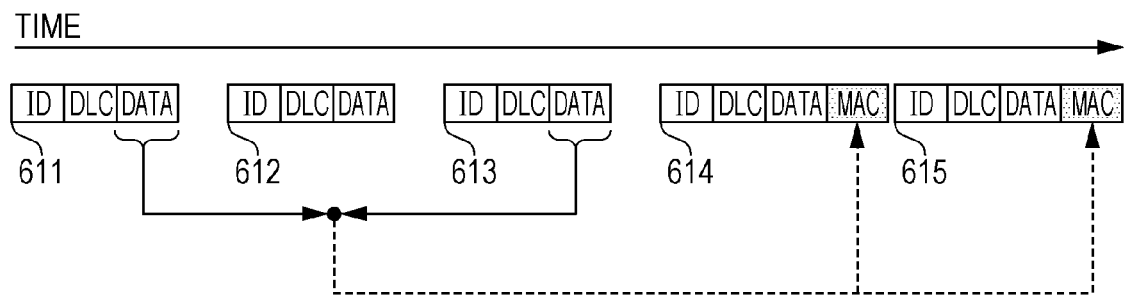
FIG. 27 is a diagram illustrating an example of a pattern relating to addition of MACs to data frames in a second modification of the second embodiment.

The pattern relating to the addition of MACs to data frames illustrated in FIG. 17 in the second embodiment can be modified as in an example illustrated in FIG. 27.

In the example of five data frames illustrated in FIG. 27, an exemplary data frame 612 does not include a MAC or MAC calculation data. In the example illustrated in FIG. 27, a MAC is calculated and obtained from values of data fields included in two or more frames, divided, stored in frames different from those including data for which the MAC has been calculated along with general data, and transmitted. That is, in the example, a MAC is calculated and obtained on the basis of data fields of data frames 611 and 613. A part of the MAC is stored in a data frame 614 along with general data (that is, data not used for the calculation for obtaining a MAC) and transmitted, and another part of the MAC is stored in a data frame 615 along with general data and transmitted.

A certain algorithm that determines frame arrangement and data configuration used in the vehicle network system in accordance with the example illustrated in FIG. 27 is, for example, an algorithm in which transmission is performed with the data frames 611 and 613 to 615, which are transmitted in first and third to fifth ones, respectively, of five transmission operations as a set, belonging to the same group, the data fields of the data frames 611 and 613 including the MAC calculation data 305 indicating values to be transmitted, such as speed per hour, a data field of the data frame 612 including the general data 304 indicating a value to be transmitted, such as speed per hour, a data field of the data frame 614 including the general data 304 and a part (e.g., first 2 bytes) of a MAC obtained through calculation using the MAC calculation data 305 of the data frames 611 and 613, and a data field of the data frame 605 including the general data 304 and a remaining part (e.g., last 2 bytes) of the obtained MAC. The certain algorithm can be modified in various ways. In addition, the values to be transmitted separately included in the data frames need not be temporally separately generated or obtained but may be collectively generated or obtained or simultaneously separately generated or obtained. In addition, the data frames need not regularly (that is, at certain time intervals) be transmitted.

It is to be noted that the configuration and operation of ECUs in the vehicle network system in the second modification are the same as those of the ECUs 2100a to 2100d except that the content of the certain algorithm that determines the frame arrangement and the data configuration is changed in accordance with the example of the pattern relating to the addition of MACs illustrated in FIG. 27.

2.14 Advantageous Effects Produced by Second Modification of Second Embodiment

In the vehicle network system according to a second modification, a frame including the MAC calculation data 305 and a frame including the MAC 306 calculated from the MAC calculation data 305 can be temporally separately communicated. In addition, for example, general data that has become transmittable when the MAC 306 is transmitted can be transmitted along with the MAC. As a result, communication of frames can be completed earlier as a whole.

2.15 Third Modification of Second Embodiment

Figure 28:
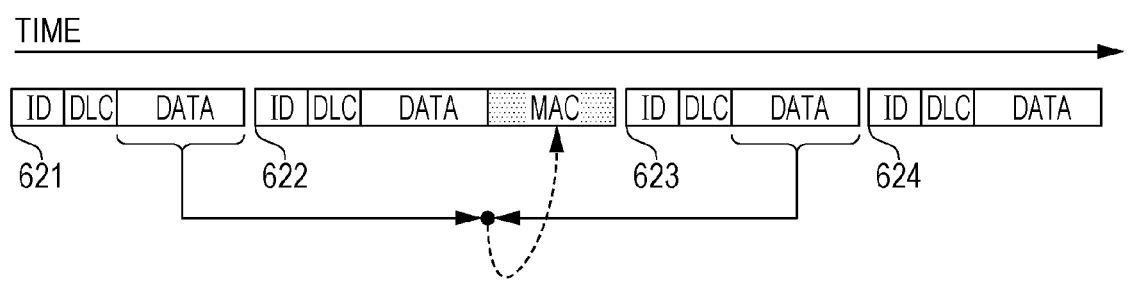
FIG. 28 is a diagram illustrating an example of a pattern relating to addition of MACs to data frames in a third modification of the second embodiment.

The pattern relating to the addition of MACs to data frames illustrated in FIG. 17 in the second embodiment can be modified as in an example illustrated in FIG. 28.

In the example of four data frames illustrated in FIG. 28, an exemplary data frame 624 does not include a MAC or MAC calculation data. In the example illustrated in FIG. 28, a MAC is calculated and obtained from values of data fields included in two or more frames, stored in frames different from those including data for which the MAC has been calculated along with general data, and transmitted. That is, in the example, a MAC is calculated and obtained on the basis of data fields of data frames 621 and 623, stored in a data frame 622 along with general data (that is, data not used for the calculation for obtaining a MAC), and transmitted. The last data frame 624 stores only general data in a data field thereof and is transmitted.

A certain algorithm that determines frame arrangement and data configuration used in the vehicle network system in accordance with the example illustrated in FIG. 28 is, for example, an algorithm in which transmission is performed with all the data frames 621 to 624, which are transmitted in four transmission operations as a set, belonging to the same group, the data fields of the data frames 621 and 623 including the MAC calculation data 305 indicating values to be transmitted, such as speed per hour, a data field of the data frame 622 including the general data 304 and a MAC obtained through calculation using the MAC calculation data 305 of the data frames 621 and 623, and a data field of the data frame 624 including the general data 304 indicating a value to be transmitted, such as speed per hour. The certain algorithm can be modified in various ways. In addition, the values to be transmitted separately included in the data frames need not be temporally separately generated or obtained but may be collectively generated or obtained or simultaneously separately generated or obtained. In addition, the data frames need not regularly (that is, at certain time intervals) be transmitted.

It is to be noted that the configuration and operation of ECUs in the vehicle network system in a third modification are the same as those of the ECUs 2100a to 2100d except that the content of the certain algorithm that determines the frame arrangement and the data configuration is changed in accordance with the example of the pattern relating to the addition of MACs illustrated in FIG. 28. Although the number of data frames received is determined using the total number of frames 2322 in step S2107 (FIG. 25) of the process for receiving data frames in the second embodiment, however, a timing at which the process for verifying a MAC can start is determined using the number of frames including MAC calculation data 2323 and the number of frames including a MAC 2324 (FIG. 20) in the third modification. As a result, the process for verifying a MAC can start before the number of received frames reaches the total number of frames 2322. For this reason, for example, it is effective to determine the frame arrangement such that data other than data for which a MAC is to be calculated is arranged in a data frame transmitted after a data frame including the MAC. It is to be noted that information indicating which number of data frame, among a plurality of data frames belonging to a single group (that is, data frames to which the same frame No. is added), needs to be received before the process for verifying a MAC starts may be included in the frame property data 2311 instead of the number of frames including MAC calculation data 2323 and the number of frames including a MAC 2324. The timing at which an ECU starts the process for verifying a MAC may be determined on the basis of this.

2.16 Advantageous Effects Produced by Third Modification of Second Embodiment

In the vehicle network system according to the third modification, communication of frames can be completed earlier since an ECU can start the process for verifying a MAC before the number of received frames reaches the total number of frames 2322.

2.17 Supplementation

Although various patterns relating to the addition of MACs have been described above, these are just examples, and various patterns may be used at arbitrary timings. It is to be noted that a state in which a MAC is included in a single frame (that is, a state in which the MAC can be immediately verified after the frame is received) will be referred to as "single frame". In addition, a state in which a MAC is divided between a plurality of frames will be referred to as "multi-frame".

In an ECU, one of various algorithms that arbitrarily determine whether to transmit data to be transmitted with single frame or multi-frame and perform switching at arbitrary timings may be used as the certain algorithm that determines the frame arrangement and the data configuration of the data.

Other Embodiments

The first and second embodiments and the first to third modifications have been described above as examples of the techniques according to the present disclosure. The techniques according to the present disclosure are not limited to these, and may be applied to embodiments obtained by making changes, replacement, addition, omission, and the like as necessary. For example, the following modifications are also included in an aspect of the present disclosure.

(1) The patterns relating to the addition of MACs described in the above embodiments may be different between IDs of frames. In addition, even if an ID remains the same between frames, a pattern relating to the addition of MACs is not limited to one pattern, and may be changed as necessary. For example, the pattern relating to the addition of MACs may be changed by sequentially switching the certain algorithm using a plurality of certain algorithms that determine frame arrangement and data configuration and that are predetermined in such a way as to achieve patterns relating to the addition of MACs. The changing timings may be regular or at random. In addition, the pattern relating to the addition of MACs may be changed in accordance with a situation of a bus occupation rate.

(2) Although an example in which the number of times that a MAC is added to frames transmitted by an ECU or the number of times that MAC calculation data is included in frames to be transmitted is decreased (thinned-out example) has been described in the above embodiments as the pattern relating to the addition of MACs, the number of times that the process for verifying a MAC is performed may be thinned out in an ECU on a frame reception side, instead. Alternatively, an ECU on a transmission side may include data for requesting an ECU on a reception side to change processing in a frame and transmit the frame.

(3) Although data values in an ID, a DLC, and a data field and counter values can be used to calculate a MAC in the above embodiments, a MAC may be calculated using values of other fields included in a data frame, or may be calculated using one of these values or a combination of a plurality of values. In addition, the size of a MAC included in a frame is not limited to a particular size. The size of a MAC may be different between transmission operations, or may be different between message IDs. In addition, similarly, the size of a data value such as speed per hour and the size of a counter value are not limited to particular sizes.

(4) Although an example in which a counter value increments in each transmission or reception operation has been described in the above embodiments, a counter value may automatically increment over time, instead. Alternatively, a value of time itself may be used instead of a counter value. That is, when a MAC is generated on the basis of a variable (a counter value, time, or the like) that changes each time a data frame is transmitted, it is possible to make it difficult to illicitly decipher a MAC. In addition, the transmission counter value may be incremented each time MAC data is generated, and the reception counter value may be incremented each time a MAC is verified.

(5) Although a data frame in the CAN protocol is described in a standard ID format in the above embodiments, an extended ID format may be used, instead.

(6) Although various flags are included in a data field of a data frame in the CAN protocol and described in the above embodiments, the various flags may be stored in an extended ID field, instead. Alternatively, the various flags may be included in another field.

(7) Although the HMAC is employed for an algorithm for calculating a MAC in the above embodiments, a cipher block chaining message authentication code (CBC-MAC) or a cipher-based MAC (CMAC) may be employed, instead. In addition, any padding method such as zero padding, ISO10126, public key cryptography standards (PKCS) #1, PKCS #5, or PKCS #7 may be used for padding employed for the calculation of a MAC, insofar as the data size of a block is necessary for the calculation. In addition, in a method for changing the size to a block such as 4 bytes, too, padding may be performed at a top, an end, or a middle. In addition, data used for the calculation of a MAC need not be successive data (e.g., successive data of 4 bytes), and may be data obtained by collecting and coupling 1-bit pieces of data in accordance with a certain rule.

(8) Although a MAC key is held for each message ID in the above embodiments, a MAC key may be held for each ECU (that is, for each group of one or more message IDs), instead. Alternatively, all the ECUs need not hold the same MAC keys. Alternatively, the ECUs connected to the same buses may hold common MAC keys. An ECU that transmits frames having the same message ID and an ECU that receives and verifies the frames, however, need to hold the same MAC keys. In addition, although a pair of counter values (a transmission counter value and a reception counter value) is held for each message ID in the above embodiments, a pair of counter values may be held for each ECU (that is, for each group of one or more message IDs), instead. Alternatively, common counter values may be used for all frames flowing through the same buses.

(9) Although the transmission counter value is used for calculating a MAC in the above embodiments, an ECU may include the entirety or a part of the transmission counter value in a data field and transmit the data field.

(10) Although an ECU that has received a data frame communicated between ECUs verifies a MAC in the above embodiments, a MAC verification ECU that verifies MACs added to all data frames may be included in the vehicle network system, instead. The MAC verification ECU holds, for example, MAC keys and counter values corresponding to all message IDs. If determining that there is an error (that is, if determining that the verification fails), the MAC verification ECU may transmit error frames in order to prevent other ECUs from receiving a data frame.

(11) The arrangement, expression modes, and the like of the various flags (flags that can function as identifiers relating to data used for calculation for obtaining a MAC) described in the above embodiments, such as the data field headers 301 and 2301 and the start flag 302, are just examples. For this reason, for example, the data field headers 301 and 2301 may be arranged at certain positions other than tops of data fields, or the same content as the various flags may be set in a different expression mode, instead. It is to be noted that the various flags have a function of identifying information necessary to verify identification information indicating whether a MAC needs to be verified or information regarding an area of data for which a MAC is to be calculated (e.g., information such as a type of content of a data field, positions of areas of data of various types, and data size), for example, as identifiers relating to data used for calculation for obtaining a MAC.

(12) The certain algorithms that determine frame arrangement and data configuration described in the above embodiments are achieved, for example, by a processor that executes control programs using an ECU. A storage medium (a memory or the like) storing the control programs relating to the certain algorithms may be incorporated into the ECU, or the ECU may obtain the control programs from outside and store the control programs in the storage medium.

(13) Although the ECUs transmit data frames in the above embodiments, the vehicle network system may include an ECU that only receives data frames and that does not transmit data frames, instead. On the other hand, the vehicle network system may include an ECU that only transmits data frames and does not receive data frames, instead.

(14) The CAN protocol described in the above embodiments may have a broader meaning encompassing derivative protocols such as time-triggered CAN (TTCAN) and CAN with flexible data rate (CAN FD).

(15) The MAC key holding section and the counter holding section in the above embodiments may be stored in a register of hardware called a "CAN controller" or firmware operating on a microcontroller that operates in connection with the CAN controller.

(16) Although the ECUs in the above embodiments are, for example, devices each including a digital circuit, an analog circuit, a communication circuit, and the like such as a processor and a memory, the ECUs may each also include other hardware components such as a hard disk device, a display, a keyboard, a mouse, and the like. In addition, functions need not be achieved in a software manner by a processor that executes the control programs stored in the memory, but may be achieved by dedicated hardware (a digital circuit or the like).

(17) Part or all of components of each device (an ECU or the like) in the above embodiments may be configured by a single system large-scale integration (LSI) circuit. The system LSI is a super-multifunctional LSI fabricated by integrating a plurality of components on a single chip and is specifically a computer system configured by including a microprocessor, a ROM, a RAM, and the like. The RAM stores a computer program. The system LSI achieves functions thereof when the microprocessor operates in accordance with the computer program. Alternatively, the components of each device may be individually achieved as a chip, or some or all of the components may be achieved as a chip. In addition, although the term "system LSI" is used here, a term "IC", "LSI", "super LSI", or "ultra LSI" may be used, instead, depending on a degree of integration. In addition, a method for fabricating an integrated circuit is not limited to a LSI, and each device may be achieved by a dedicated circuit or a general-purpose processor. After an LSI is fabricated, a programmable field-programmable gate array (FPGA) and a reconfigurable processor capable of reconfiguring connections and settings of circuit cells inside the LSI may be used. Furthermore, if a technique for fabricating an integrated circuit that replaces LSI appears as a result of evolution of semiconductor technologies or a derivative technology, function blocks may be obviously integrated together using the technique. Application of biotechnology is one of such possibilities.

(18) Part or all of the components of each device may be configured by an integrated circuit (IC) card or a separate module removably attached to each device. The IC card or the module is a computer system configured by a microprocessor, a ROM, a RAM, and the like. The IC card or the module may include the super-multifunctional LSI. The IC card or the module achieves functions thereof when the microprocessor operates in accordance with a computer program. The IC card or the module may be tamper-resistant.

(19) An aspect of the present disclosure may be the transmission method or the reception method described above. Alternatively, an aspect of the present disclosure may be a computer program that achieves the method using a computer or a digital signal including the computer program. In addition, an aspect of the present disclosure may be the computer program or the digital signal stored in a computer-readable recording medium such as a flexible disk, a hard disk, a CD-ROM, an magneto-optical (MO) disk, a digital versatile disc (DVD), a DVD-ROM, a DVD-RAM, a Blu-ray Disc (BD; registered trademark), a semiconductor memory, or the like. In addition, an aspect of the present disclosure may be the digital signal recorded on one of these recording media. In addition, an aspect of the present disclosure may be the computer program or the digital signal transmitted through an electrical communication line, a wireless or wired communication line, a network typified by the Internet, datacasting, or the like. In addition, an aspect of the present disclosure may be a computer system including a microprocessor and a memory, the memory storing the computer program and the microprocessor operating in accordance with the computer program. In addition, the program or the digital signal may be executed by another independent computer system by recording the program or the digital signal on the recording medium and transporting the recording medium or by transporting the program or the digital signal through the network or the like.

(20) Modes achieved by arbitrarily combining the components and the functions described in the above embodiments and modifications are also included in the scope of the present disclosure.

The present disclosure can be used for achieving security for messages communicated in a vehicle network system.

What is claimed is:

1. A vehicle network system, the vehicle network system comprising:
a network;
a first electronic control unit connected to the network; and
a second electronic control unit connected to the network,
wherein the first electronic control unit performs operations including:
transmitting, via the network, one message, the one message including a header area and a payload area,
wherein the one message includes first data and an identifier, the first data that is in the header area or the payload area is used for a calculation for obtaining a message authentication code indicating authenticity of transmission content, and the identifier that is in the payload area indicates a position of the first data, and
wherein the second electronic control unit performs operations including:
receiving the one message transmitted via the network;
selecting the first data used for the calculation for obtaining the message authentication code in accordance with the position of the first data indicated by the identifier included in the one message; and
verifying the message authentication code using the selected first data.

2. The vehicle network system according to claim 1,
wherein the first electronic control unit obtains the message authentication code through calculation using the first data included in the one message, and
wherein, among at least one message including the one message, at least one of the at least one message includes the message authentication code.

3. The vehicle network system according to claim 2,
wherein the identifier further includes information indicating a number of the at least one message, and
wherein, after receiving the number of the at least one message indicated by the identifier, the second electronic control unit performs the verifying through the calculation using the first data arranged in the position indicated by the identifier.

4. The vehicle network system according to claim 1, wherein the identifier indicates plural areas in the one message.

5. A method for a vehicle network system, the vehicle network system including a network, a first electronic control unit connected to the network, and a second electronic control unit connected to the network, the method comprising:
receiving, by the second electronic control unit, one message, which is transmitted by the first electronic control unit via the network, wherein the one message includes a header area and a payload area, the one message includes first data and an identifier, the first data that is in the header area or the payload area is used for a calculation for obtaining a message authentication code indicating authenticity of transmission content, and the identifier that is in the payload area indicates a position of the first data;

selecting, by the second electronic control unit, the first data used for the calculation for obtaining the message authentication code in accordance with the position of the first data indicated by the identifier included in the one message; and performing, by the second electronic control unit, a process for verifying the message authentication code using the selected first data.

6. The method according to claim 5, wherein the identifier indicates a type of content of a data field of the one message.

7. The method according to claim 6, wherein, among at least one message including the one message, at least one of the at least one message includes the message authentication code, wherein the type of content indicates whether the payload area includes the first data used for the calculation for obtaining the message authentication code, and wherein, if the type of content indicates that the payload area includes the first data used for the calculation for obtaining the message authentication code, the process for verifying is performed through the calculation using a value of an area of the first data used for the calculation for obtaining the message authentication code included in the data field.

8. The method according to claim 5, wherein the identifier indicates an area of data of an arbitrary type in the payload area of the one message.

9. The method according to claim 8, wherein, among at least one message including the one message, at least one of the at least one message includes the message authentication code, and wherein the area of data of the arbitrary type is an area of the first data used for the calculation for obtaining the message authentication code.

10. The method according to claim 5, wherein the identifier is arranged in the payload area of the one message.

11. The method according to claim 5, wherein the vehicle network system employs a controller area network protocol, the network indicates a bus, the message indicates a data frame, and the payload indicates a data field.

12. An electronic control unit, the electronic control unit comprising:

one or more memories; and circuitry that, in operation, performs operations, the operations including:

receiving one message, which is transmitted by another electronic control unit via a network, the one message including a header area and a payload area, wherein the one message includes first data and an identifier, the first data that is in the header area or the payload area is used for a calculation for obtaining a message authentication code indicating authenticity of transmission content, the identifier that is in the payload area indicates a position of the first data;

selecting the first data used for the calculation for obtaining the message authentication code in accordance with the position of the first data indicated by the identifier included in the one message; and verifying the message authentication code using the selected first data.

* * * * *